(12) United States Patent
Morino et al.

(10) Patent No.: US 10,836,524 B2
(45) Date of Patent: Nov. 17, 2020

(54) BAG SUPPLY SYSTEM AND BAG SUPPLY METHOD

(71) Applicant: TOYO JIDOKI CO., LTD., Tokyo (JP)

(72) Inventors: Manabu Morino, Yamaguchi-ken (JP); Kazuo Fukunaga, Yamaguchi-ken (JP); Shota Kajihara, Yamaguchi-ken (JP)

(73) Assignee: TOYO JIDOKI CO., LTD., Tokyo (JP)

( * ) Notice: Subject to any disclaimer, the term of this patent is extended or adjusted under 35 U.S.C. 154(b) by 0 days.

(21) Appl. No.: 16/191,553

(22) Filed: Nov. 15, 2018

(65) Prior Publication Data
US 2019/0152635 A1    May 23, 2019

(30) Foreign Application Priority Data
Nov. 20, 2017 (JP) ................. 2017-223068

(51) Int. Cl.
*B65B 43/20* (2006.01)
*B65G 1/06* (2006.01)
(Continued)

(52) U.S. Cl.
CPC .......... *B65B 43/20* (2013.01); *B25J 15/0066* (2013.01); *B65B 43/18* (2013.01); *B65B 65/006* (2013.01);
(Continued)

(58) Field of Classification Search
CPC ....... B65B 43/20; B65B 65/006; B65B 43/18; B65B 2210/02; B65H 1/027; B65H 1/30;
(Continued)

(56) References Cited

U.S. PATENT DOCUMENTS 1,031,595 A * 7/1912 Taber .................... A47F 5/0006
                                                      211/52
3,580,470 A * 5/1971 Leonard ............ B65D 5/48046
                                                      206/554
(Continued)

FOREIGN PATENT DOCUMENTS

JP        08-217236 A    8/1996
JP     2000-191156 A    7/2000
(Continued)

*Primary Examiner* — Lynn E Schwenning
(74) *Attorney, Agent, or Firm* — Pillsbury Winthrop Shaw Pittman, LLP

(57) ABSTRACT

A bag supply system includes a bag accommodating unit having a holding member to externally support a bag bundle; and a bag supply device to which bags are supplied from the bag accommodating unit. The bag supply device includes a taking-out unit that takes the bag bundle out of the bag accommodating unit and carries the bag bundle to a depositing unit. The holding member supports the bag bundle in the state of exposing a part of one of a front surface and a back surface of each of a bag arranged on a frontmost side and a bag arranged on a backmost side of two or more bags included in the bag bundle. The taking-out unit takes the bag bundle out of the bag accommodating unit while holding the exposed part of the bag bundle supported by the holding member.

29 Claims, 22 Drawing Sheets

(51) Int. Cl.
 *B65B 43/18* (2006.01)
 *B65H 1/26* (2006.01)
 *B65H 1/30* (2006.01)
 *B65H 1/28* (2006.01)
 *B65H 1/02* (2006.01)
 *B25J 15/00* (2006.01)
 *B65B 65/00* (2006.01)

(52) U.S. Cl.
 CPC ............. *B65G 1/06* (2013.01); *B65H 1/027* (2013.01); *B65H 1/266* (2013.01); *B65H 1/28* (2013.01); *B65H 1/30* (2013.01); *B65B 2210/20* (2013.01); *B65H 2301/42252* (2013.01); *B65H 2405/332* (2013.01); *B65H 2701/191* (2013.01); *B65H 2801/81* (2013.01)

(58) Field of Classification Search
 CPC .............. B65H 1/28; B65H 1/266; B65H 2301/42252; B65H 2405/332; B65H 2701/191; B65H 2801/81; B25J 15/0066; B65G 1/06
 See application file for complete search history.

(56) References Cited

U.S. PATENT DOCUMENTS

| | | | | |
|---|---|---|---|---|
| 3,831,293 A * | 8/1974 | Ingram | ............. | B65G 1/06 34/236 |
| 3,902,603 A * | 9/1975 | Wilson | ............. | B62B 3/005 211/133.1 |
| 3,982,642 A * | 9/1976 | Muller | ............. | A46D 1/00 414/268 |
| 4,397,606 A * | 8/1983 | Bruton | ............. | A47F 5/0093 108/65 |
| 4,705,175 A * | 11/1987 | Howard | ............. | A47F 5/103 108/109 |
| 5,111,940 A * | 5/1992 | VanNoord | ............. | G11B 33/0461 211/162 |
| 5,178,506 A * | 1/1993 | Meschi | ............. | B41J 11/58 271/221 |
| 5,595,468 A * | 1/1997 | Wald | ............. | B65B 43/14 414/331.09 |
| 5,984,623 A * | 11/1999 | Smith | ............. | B65G 61/00 294/104 |
| 6,164,462 A * | 12/2000 | Mumford | ............. | A47F 5/0093 108/102 |
| 6,638,660 B2 * | 10/2003 | Stone | ............. | A47B 47/024 211/153 |
| 9,573,787 B2 * | 2/2017 | Sperl | ............. | B65H 31/3045 |
| 2003/0103838 A1 * | 6/2003 | Liehs | ............. | B65B 43/126 414/403 |
| 2003/0150829 A1 * | 8/2003 | Linden | ............. | A47F 1/12 211/126.1 |
| 2007/0158289 A1 * | 7/2007 | Chen | ............. | A47B 47/00 211/186 |
| 2013/0287537 A1 * | 10/2013 | Hecht | ............. | B65G 1/04 414/788.4 |
| 2013/0343857 A1 * | 12/2013 | Yoshikane | ............. | B65B 43/14 414/798.9 |
| 2015/0274336 A1 * | 10/2015 | Kaneko | ............. | B65B 31/04 53/79 |

FOREIGN PATENT DOCUMENTS

| | | | | |
|---|---|---|---|---|
| JP | 2000-296814 | * | 10/2000 | ............. B65B 43/14 |
| JP | 2000-296814 A | | 10/2000 | |

* cited by examiner

BAG SUPPLY SYSTEM AND BAG SUPPLY METHOD

CROSS-REFERENCE TO RELATED APPLICATIONS

This application is based upon and claims the benefit of priority from Japanese Patent Application No. 2017-223068, filed on Nov. 20, 2017; the entire contents of which are incorporated herein by reference.

TECHNICAL FIELD

The present invention relates to a bag supply system and a bag supply method configured to supply a plurality of bags to a bag supply device.

BACKGROUND ART

Bag processing devices such as a bag-filling and packaging machine and a spout attaching machine perform various types of processing by continuously using a plurality of bags. For this reason, it is necessary to continuously supply an empty bag to the bag processing device at an appropriate timing such that the processing in the bag processing device is not interrupted.

For example, a bag-filling and packaging machine disclosed in Japanese patent application publication No. 2000-191156 includes multiple stockers (namely, magazines) capable of stocking multiple empty bags. These stockers are arranged in parallel, all the stockers are laterally moved after all the empty bags stored in a stocker have been used, and empty bags stored in the next stocker are used in the bag-filling and packaging machine. When this bag-filling and packaging machine of Japanese patent application publication No. 2000-191156 is used, a worker can replenish a plurality of empty bags to the multiple stockers at one time, and thus, it is possible to reduce the number of times of replenishing empty bags per unit time.

Further, Japanese patent application publication No. 8-217236 discloses a device that stacks bag bundles on a tray one by one. Further, Japanese patent application publication No. 2000-296814 discloses a device that selectively and automatically installs a bag cassette containing a packaging bag onto a packaging device.

SUMMARY OF INVENTION

Technical Problem

When the bag processing device including the magazine is used, there is limit on the number of empty bags that can be stored in the magazine, and thus, the worker needs to replenish empty bags at an appropriate timing as necessary while continuously monitoring a storage state of the empty bags in the magazine. In practice, the worker needs to constantly replenish empty bags to the magazine while paying attention to the storage state of the empty bags in the magazine during an operation of the bag processing device in most cases. Thus, a burden on the worker regarding the replenishment of the empty bag is extremely great.

In particular, when the processing in the bag processing device is performed at high speed, the empty bags are also consumed at high speed, and thus, the burden on the work regarding the replenishment work of the empty bag further increases. Further, when a replenishment speed of the empty bag by the worker is slower than a processing speed of the bag processing device (that is, a consumption speed of the empty bag), the replenishment work of the empty bag becomes a bottleneck, which becomes an obstacle in improving the processing capability of the bag processing device.

As the empty bags are stored in the plurality of magazines as in the device of Japanese patent application publication No. 2000-191156, it is possible to increase the amount of stocking empty bags and to reduce the number of times of replenishing empty bags per unit time. In such a case, however, the worker needs to replenish empty bags to each magazine while moving a place, and thus, the burden on the worker regarding the replenishing work increases as the number of storable empty bags increases (that is, as a size of the magazine and the number of magazines increase).

Incidentally, the bag processing device does not necessarily include the magazine. In a bag processing device that does not include the magazine, it is necessary to timely supply new empty bags to the bag processing device so as to be linked with consumption of empty bags. Such supply of empty bags to the bag processing device is often performed manually, which is similar to the above-described replenishment of empty bags with respect to the magazine. Even in the case of manually supplying an empty bag to the bag processing device that does not include the magazine, the burden on the worker is extremely great. In particular, when the empty bag is not supplied to the bag processing device at an appropriate timing due to inattention of the worker or the like, the processing in the bag processing device is interrupted so that the processing efficiency deteriorates.

Further, for example, when multiple empty bags manufactured by a bag manufacturer are carried in the state of being accommodated in a cardboard box, there is a concern that foreign substances, such as a paper piece of the cardboard box and dust in the cardboard box, may soar at the time of taking an empty bag out of the cardboard box. Therefore, it is also required to prevent a supply place of the empty bag from being contaminated due to the foreign substances soaring at the time of taking out the empty bag. Further, frequent entry and exit of a human, such as the worker, into and from an installation place of the magazine and an installation place of a bag supply device that supplies an empty bag to the bag processing device, or the presence of the human itself is not desirable in some cases from the viewpoint of hygiene. In particular, when food, sanitary goods, or the like is to be accommodated in an empty bag, it is sometimes required to supply the empty bag in an environment such as a clean booth which has been highly purified, and it is not preferable for such a clean environment to be contaminated by the entry and exit or the presence of the human.

Further, in the device of Japanese patent application publication No. 8-217236, the bag bundle bound by a band is accommodated in the tray so as to extend in the horizontal direction, and the band is cut in a state where the bag bundle is stacked on the tray. Thereafter, a lower part of a bag group pushed up by a push-up device is gripped by a pair of parallel chucks, and the bag group is taken out of the tray. In this manner, in the device of Japanese patent application publication No. 8-217236, a series of steps such as cutting of the band, pushing-up of the bag group, and insertion of the parallel chucks into the lower part of the bag group is required in order to take the bag group out of the tray so that it takes time and labor and the bag bundle bound by the band is set as an object to be processed. In particular, a band engaging member is inserted between the band and an upper surface of the bag bundle to raise the band from the upper surface of the bag bundle in order to cut the band, and at that time, there is a concern that the upper surface of the bag bundle may be damaged by the band engaging member.

Further, in the device of Japanese patent application publication No. 2000-296814, a pin is inserted into a pin hole formed in a bag so that the packaging bags are accommodated in the bag cassette in a stacked state. In this manner, the pin hole needs to be formed in advance at a predetermined position in the bag handled by the device of Japanese patent application publication No. 2000-296814 so that types of applicable bags are limited.

The present invention has been made in view of the above circumstances, and an object thereof is to provide a device and a method capable of easily taking a bag bundle, constituted by a group of a plurality of bags, out of an accommodating place. Further, another object is to provide a device and a method capable of taking out the bag bundle while preventing damage of a bag. Further, still another object is to provide a device and a method capable of flexibly coping with various types of bags. Further, still another object is to provide a device and a method capable of improving productivity while mitigating a burden on a worker regarding replenishment work or supply work of a bag. Further, still another object is to provide a device and a method capable of preventing contamination of a supply place of a bag. Further, still another object is to provide a device and a method capable of supplying a bag without causing a human to be present at a place where the bag is supplied to a bag supply device.

Solution to Problem

One aspect of the present invention is directed to a bag supply system comprising: a bag accommodating unit having a holding member to externally support a bag bundle; a moving unit that moves the bag accommodating unit to a bag bundle replenishment position where the bag bundle is supplied to the bag accommodating unit and a bag bundle supply position where the bag bundle is taken out of the bag accommodating unit; and a hag supply device to which a plurality of bags are supplied from the bag accommodating unit arranged at the bag bundle supply position, wherein: the bag supply device includes: a taking-out unit that takes the bag bundle out of the bag accommodating unit and carries the bag bundle to a depositing unit; a bag transporting unit that transports the bag bundle from the depositing unit to accommodate the bag bundle in a magazine; and a first bag pickup unit that takes out two or more bags included in the bag bundle accommodated in the magazine one by one, the holding member supports the bag bundle in a state of exposing a part of one of a front surface and a back surface of each of a bag arranged on a frontmost side and a bag arranged on a backmost side of the two or more bags included in the bag bundle, and the taking-out unit takes the bag bundle out of the bag accommodating unit while holding the exposed part of the bag bundle supported by the holding member.

Desirably, the front surfaces and the back surfaces of the two or more bags included in the bag bundle are directed in a same direction, and the holding member supports the bag bundle in a state where a normal direction of the front surfaces and the back surfaces of the two or more bags is directed in a direction other than a direction parallel to a vertical direction which is a gravity acting direction.

Desirably, the taking-out unit includes: a bag holding unit capable of holding and releasing the bag bundle; and a three-dimensional moving unit that three-dimensionally moves the bag holding unit.

Desirably, the depositing unit includes: a transport placement portion on which the bag bundle is placed by the taking-out unit; and a guide portion which guides the bag bundle on the transport placement portion, and the bag transporting unit transports the bag bundle on the transport placement portion along the guide portion and accommodates the bag bundle in the magazine.

Desirably, the bag transporting unit includes a pusher which pushes the bag bundle on the transport placement portion toward the magazine.

Desirably, the moving unit includes a bag stocker which supports the bag accommodating unit and has a body portion provided to be movable between an inside and an outside of a supply room, and the bag supply device is provided inside the supply room, and the plurality of bags are supplied to the bag supply device from the bag accommodating unit supported by the body portion.

Desirably, a plurality of bag stockers are provided, and a plurality of bags are supplied to the bag supply device from each of the plurality of bag stockers.

Desirably, the bag accommodating unit is supported by the body portion in the body portion to be movable in the body portion between an accommodating position and a withdrawing position where the bag accommodating unit protrudes in comparison with the bag accommodating unit arranged at the accommodating position, the bag accommodating unit has a holding portion for movement, and is moved between the accommodating position and the withdrawing position by applying a force to the holding portion for movement, and the bag supply device includes a movement device that applies a force to the holding portion for movement to move the bag accommodating unit from the accommodating position to the withdrawing position.

Desirably, the movement device is the taking-out unit.

Desirably, the bag stocker supports a plurality of bag accommodating units.

Desirably, when the moving unit moves the plurality of bag accommodating units from the bag bundle replenishment position to the bag bundle supply position, the moving unit moves the plurality of bag accommodating units in a state where at least two or more bag accommodating units among the plurality of bag accommodating units are mutually aligned in a vertical direction.

Desirably, the moving unit includes a feeding mechanism that conveys the bag accommodating unit from a bag replenishment position where the bag accommodating unit is replenished, toward the bag bundle supply position, and the plurality of bags are supplied from the bag accommodating unit to the bag supply device at the bag bundle supply position.

Desirably, a plurality of bag accommodating units are piled up and are replenished to the feeding mechanism at the bag replenishment position, and the feeding mechanism conveys the bag accommodating units one by one to the bag bundle supply position.

Desirably, the bag supply device includes an arrangement adjustment unit that adjusts mutual arrangement positions of the two or more bags included in the bag bundle received from the taking-out unit, and the taking-out unit delivers the bag bundle taken out of the bag accommodating unit to the arrangement adjustment unit, receives the bag bundle of which an arrangement position has been adjusted by the arrangement adjustment unit from the arrangement adjustment unit, and carries the bag bundle received from the arrangement adjustment unit to the depositing unit.

Desirably, the bag supply device includes: a bag conveying unit that receives a bag fed via the first bag pickup unit and conveys the bag toward a downstream side; a conveyance stopper that regulates a position of the bag conveyed by the bag conveying unit; and a second bag pickup unit that takes out the bag of which the position is regulated by the conveyance stopper and supplies the bag to a bag processing device.

Desirably, the bag conveying unit conveys a plurality of bags toward the downstream side in a state where the plurality of bags are stacked on each other, and the conveyance stopper regulates a position of a leading bag among the plurality of bags conveyed by the bag conveying unit.

Desirably, the first bag pickup unit supplies a bag taken out of the magazine to a bag processing device.

Desirably, the bag bundle is placed on the holding member, and the holding member contacts at least a part of two sides adjacent to each other, among a plurality of sides of each of the two or more bags included in the bag bundle.

Desirably, the bag accommodating unit includes a plurality of holding members.

Another aspect of the present invention is directed to a bag supply method comprising the steps of: replenishing a plurality of bags to a bag accommodating unit; and supplying the plurality of bags from the bag accommodating unit to a bag supply device, wherein: the bag accommodating unit has a holding member to externally support a bag bundle, the bag accommodating unit is moved by a moving unit to a bag bundle replenishment position where the bag bundle is supplied to the bag accommodating unit and a bag bundle supply position where the bag bundle is taken out of the bag accommodating unit, the bag supply device includes: a taking-out unit that takes the bag bundle out of the bag accommodating unit arranged at the bag bundle supply position and carries the bag bundle to a depositing unit; a bag transporting unit that transports the bag bundle from the depositing unit and accommodates the bag bundle in a magazine; and a first bag pickup unit that takes out each of two or more bags included in the bag bundle accommodated in the magazine, the plurality of bags are supported by the holding member in a form of the bag bundle in the bag accommodating unit, each of the plurality of bags supplied from the bag accommodating unit to the bag supply device is a bag included in the bag bundle taken out of the holding member, the holding member supports the bag bundle in a state of exposing a part of one of a front surface and a back surface of each of a bag arranged on a frontmost side and a bag arranged on a backmost side of the two or more bags included in the bag bundle, and the taking-out unit takes the bag bundle out of the bag accommodating unit while holding the exposed part of the bag bundle supported by the holding member.

Desirably, the front surfaces and the back surfaces of the two or more bags included in the bag bundle are directed in a same direction, and the holding member supports the bag bundle in a state where a normal direction of the front surfaces and the back surfaces of the two or more bags is directed in a direction other than a direction parallel to a vertical direction which is a gravity acting direction.

Desirably, the moving unit includes a bag stocker which supports the bag accommodating unit and has a body portion provided to be movable between an inside and an outside of a supply room, the bag supply device is provided inside the supply room, and the plurality of bags are supplied from the bag accommodating unit supported by the body portion, the bag accommodating unit is supported by the body portion in the body portion to be movable in the body portion between an accommodating position and a withdrawing position where the bag accommodating unit protrudes in comparison with the bag accommodating unit arranged at the accommodating position, the bag accommodating unit has a holding portion for movement, and the bag accommodating unit is moved between the accommodating position and the withdrawing position by applying a force to the holding portion for movement, and the step of replenishing the plurality of bags to the bag stocker comprises the steps of: moving the bag accommodating unit from the accommodating position to the withdrawing position in the body portion; supplying a plurality of bags to the bag accommodating unit arranged at the withdrawing position and causing the holding member to support the plurality of bags as the bag bundle; and moving the bag accommodating unit in a state where the corresponding holding member supports the bag bundle, from the withdrawing position to the accommodating position.

Desirably, the bag supply device includes a movement device that applies a force to the holding portion for movement to move the bag accommodating unit from the accommodating position to the withdrawing position, the movement device is the taking-out unit, and the step of supplying the plurality of bags from the bag accommodating unit to the bag supply device includes the step of causing the movement device to apply the force to the holding portion for movement so as to move the bag accommodating unit from the accommodating position to the withdrawing position.

Desirably, the bag stocker includes a plurality of bag accommodating units.

Desirably, the moving unit includes a feeding mechanism that conveys the bag accommodating unit from a bag replenishment position where the bag accommodating unit is replenished toward the bag bundle supply position, and the plurality of bags are supplied from the bag accommodating unit to the bag supply device at the bag bundle supply position.

Desirably, a plurality of bag accommodating units are piled up and are replenished to the feeding mechanism at the bag replenishment position, and the feeding mechanism conveys the bag accommodating units one by one to the bag bundle supply position.

Desirably, the bag supply device includes an arrangement adjustment unit that adjusts mutual arrangement positions of the two or more bags included in the bag bundle received from the taking-out unit, and the step of supplying the plurality of bags from the bag accommodating unit to the bag supply device includes the steps of: delivering the bag bundle taken out of the bag accommodating unit by the taking-out unit, to the arrangement adjustment unit; causing the arrangement adjustment unit to adjust an arrangement position of the bag bundle; and causing the taking-out unit to receive the bag bundle of which the arrangement position has been adjusted by the arrangement adjustment unit, from the arrangement adjustment unit and to carry the bag bundle to the depositing unit.

Desirably, the magazine holds the accommodated bag bundle to be movable up and down, and the step of supplying the plurality of bags from the bag accommodating unit to the bag supply device includes the step of causing the first bag pickup unit to take out a bag arranged at an uppermost position of the bag bundle accommodated in the magazine.

Desirably, the bag accommodating unit includes a plurality of holding members.

According to a certain aspect of the present invention, it is possible to easily take the bag bundle configured using a set of the plurality of bags out of the accommodating place. Further, it is possible to take out the bag bundle while preventing damage of the bag according to a certain aspect of the present invention. Further, it is possible to flexibly cope with various types of bags according to a certain aspect of the present invention. Further, it is possible to improve the productivity while mitigating the burden on the worker regarding the replenishment work or the supply work of the bag according to a certain aspect of the present invention. Further, it is possible to prevent the contamination of the bag supply place according to a certain aspect of the present invention. Further, it is possible to supply the bag without causing the human to be present at the place where the bag is supplied to the bag supply device according to a certain aspect of the present invention.

DESCRIPTION OF EMBODIMENTS

Figure 1:
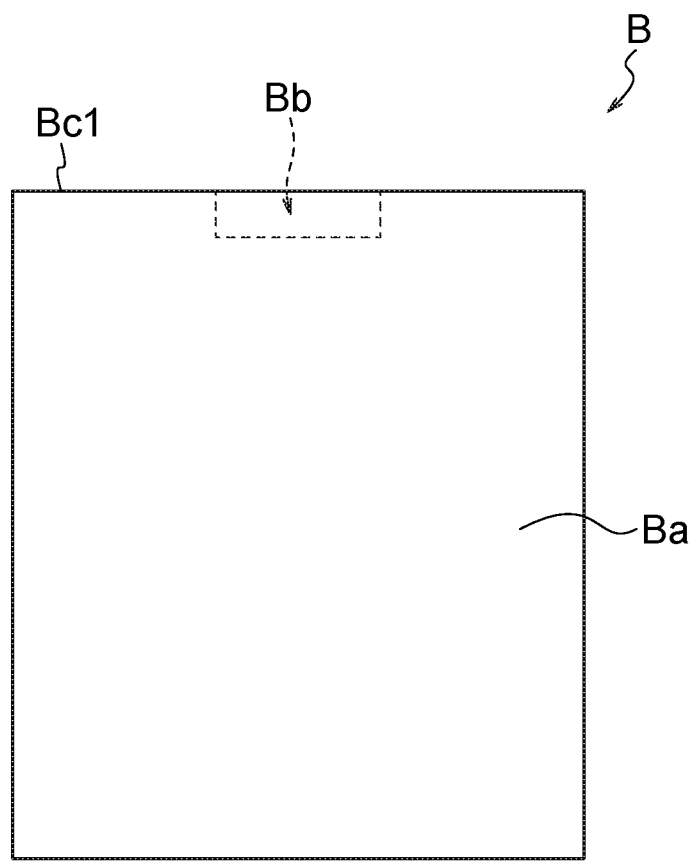
FIG. 1 is a plan view illustrating an example of a bag.

Hereinafter, an embodiment of the present invention will be described with reference to the drawings. Incidentally, elements illustrated in the drawings include elements not illustrated to have exactly the same size and shape among the drawings for the sake of convenience, but those skilled in the art can appropriately understand such elements, and further, can understand that each element may have various modifications.

A bag supply system to be described below is a bag supply system including: a bag accommodating unit having a holding member to externally support a bag bundle; a moving unit that moves the bag accommodating unit to a bag bundle replenishment position where the bag bundle is supplied to the bag accommodating unit and a bag bundle supply position where the bag bundle is taken out of the bag accommodating unit; and a bag supply device to which a plurality of bags are supplied from the bag accommodating unit arranged at the bag bundle supply position, in which the bag supply device includes: a taking-out unit that takes the bag bundle out of the bag accommodating unit and carries the bag bundle to a depositing unit; a bag transporting unit that transports the bag bundle from the depositing unit to accommodate the bag bundle in a magazine; and a first bag pickup unit that takes out two or more bags included in the bag bundle accommodated in the magazine one by one, the holding member supports the bag bundle in a state of exposing a part of one of a front surface and a back surface of each of a bag arranged on a frontmost side and a bag arranged on a backmost side of the two or more bags included in the bag bundle, and the taking-out unit takes the bag bundle out of the bag accommodating unit while holding the exposed part of the bag bundle supported by the holding member. Further, a bag supply method to be described below is a bag supply method including: a step of replenishing a plurality of bags to a bag accommodating unit; and a step of supplying the plurality of bags from the bag accommodating unit to a bag supply device, in which the bag accommodating unit has a holding member to externally support a bag bundle, the bag accommodating unit is moved by a moving unit to a bag bundle replenishment position where the bag bundle is supplied to the bag accommodating unit and a bag bundle supply position where the bag bundle is taken out of the bag accommodating unit, the bag supply device includes: a taking-out unit that takes the bag bundle out of the bag accommodating unit arranged at the bag bundle supply position and carries the bag bundle to a depositing unit; a bag transporting unit that transports the bag bundle from the depositing unit to accommodate the bag bundle in a magazine; and a first bag pickup unit that takes out each of two or more bags included in the bag bundle accommodated in the magazine, the plurality of bags are supported by the holding member in a form of the bag bundle in the bag accommodating unit, each of the plurality of bags supplied from the bag accommodating unit to the bag supply device is a bag included in the bag bundle taken out of the holding member, the holding member supports the bag bundle in a state of exposing a part of one of a front surface and a back surface of each of a bag arranged on a frontmost side and a bag arranged on a backmost side of the two or more bags included in the bag bundle, and the taking-out unit takes the bag bundle out of the bag accommodating unit while holding the exposed part of the bag bundle supported by the holding member.

According to these bag supply system and bag supply method, it is possible to easily take the bag bundle configured using a set of a plurality of bags out of an accommodating place (that is, the bag bundle accommodating portion), and to improve productivity. Further, it is possible to take out the bag bundle while preventing damage of the bag by holding a part of the bag bundle that is not supported by the holding member but is exposed and supplying the plurality of bags to the bag supply device.

In the following embodiment, as an example, a description will be given regarding an empty bag group supply system (bag supply system), configured to supply empty bags manufactured by a bag manufacturer to a magazine storing multiple empty bags (bags) to be supplied to a packaging machine (bag processing device). Specifically, an empty bag group accommodating wagon (bag stocker) capable of stacking the multiple empty bags and the empty bag group supply system using the empty bag group accommodating wagon will be described hereinafter.

FIG. 1 is a plan view illustrating an example of a bag B. A body portion Ba of the bag B illustrated in FIG. 1 has a rectangular planar shape, and each of a front surface and a back surface of the bag B is configured using a surface of a region surrounded by a plurality of edges of the body portion Ba. A mouth portion Bb is formed at one of the plurality of edges of the bag B (see a reference sign "Bc1" in FIG. 1). The mouth portion Bb is a portion in which a through-hole communicating an inside and an outside of the bag B is formed or to be formed. Accordingly, at a stage where the bag B is replenished to the bag stocker, the bag supply device, and the bag processing device to be described later, a state where the inside and the outside of the bag B communicate with each other through the mouth portion Bb may be formed, or state where the inside and the outside of the bag B do not communicate with each other through the mouth portion Bb may be formed. A shape of the mouth portion Bb is not limited, and may be formed as a simple through-hole, or an instrument such as a spout may be attached to the mouth portion Bb.

The bag B to which the device and method to be described below can be applied is not limited to the form of the bag B illustrated in FIG. 1. For example, the bag B illustrated in FIG. 1 includes a pair of short edges and a pair of long edges, but the lengths of all the edges may be equal to each other. Further, the mouth portion Bb illustrated in FIG. 1 is formed at the short edge, but may be formed at the long edge, or can be formed at an arbitrary edge. Further, the planar shape of the bag B may be a polygonal shape other than the quadrangular shape, or at least a part of the edge of the bag B may curve.

Next, a description will be given regarding an example of a bag supply system 10, which includes a bag stocker 11 (moving unit) to which a plurality of the bags B are replenished and a bag supply device 12 to which the plurality of bags B are supplied from the bag stocker 11, and an example of a bag supply method using the bag supply system 10.

Figure 2:
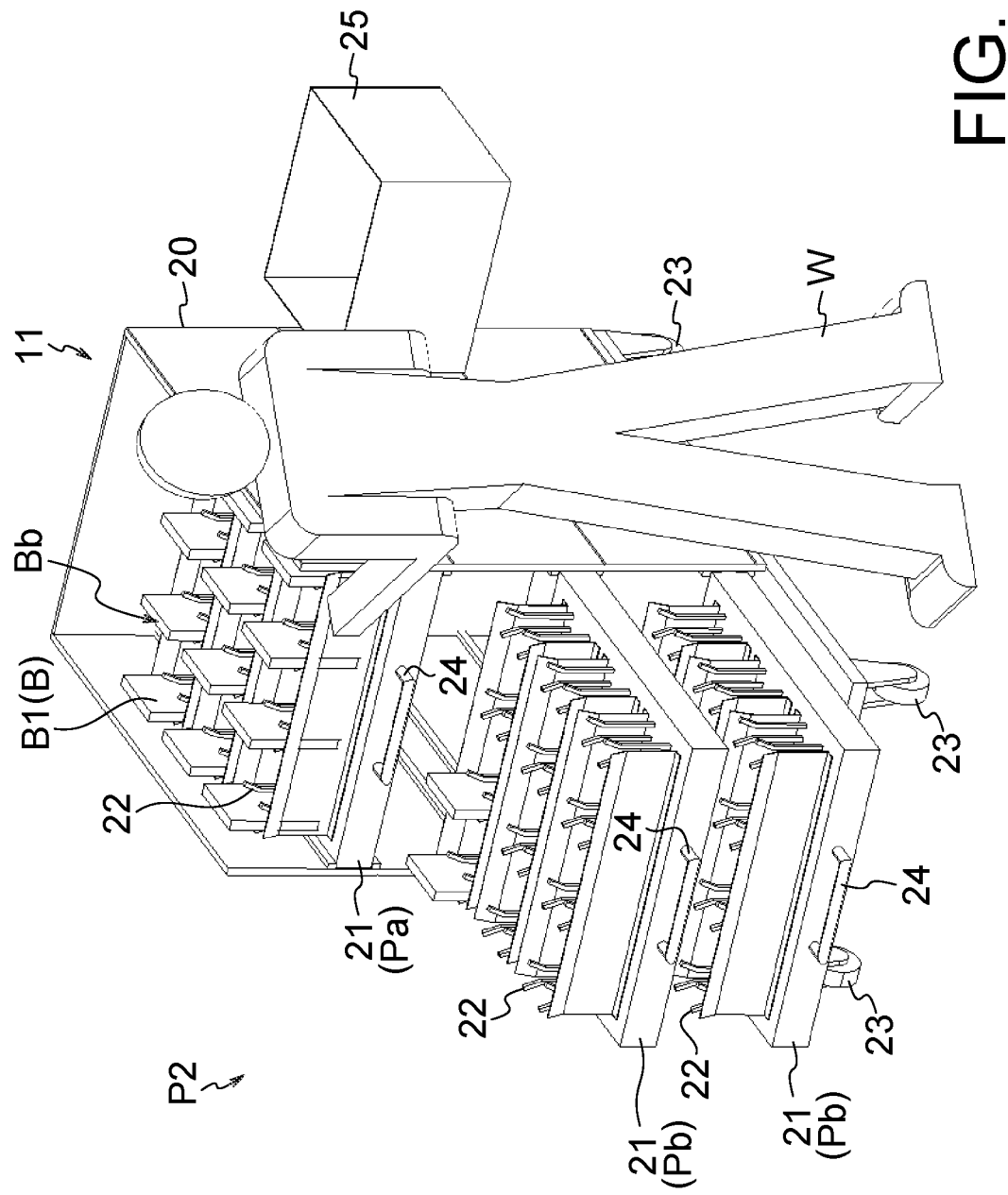
FIG. 2 is a view for describing work of replenishing a plurality of bags to a bag stocker at a receiving position.
Figure 3:
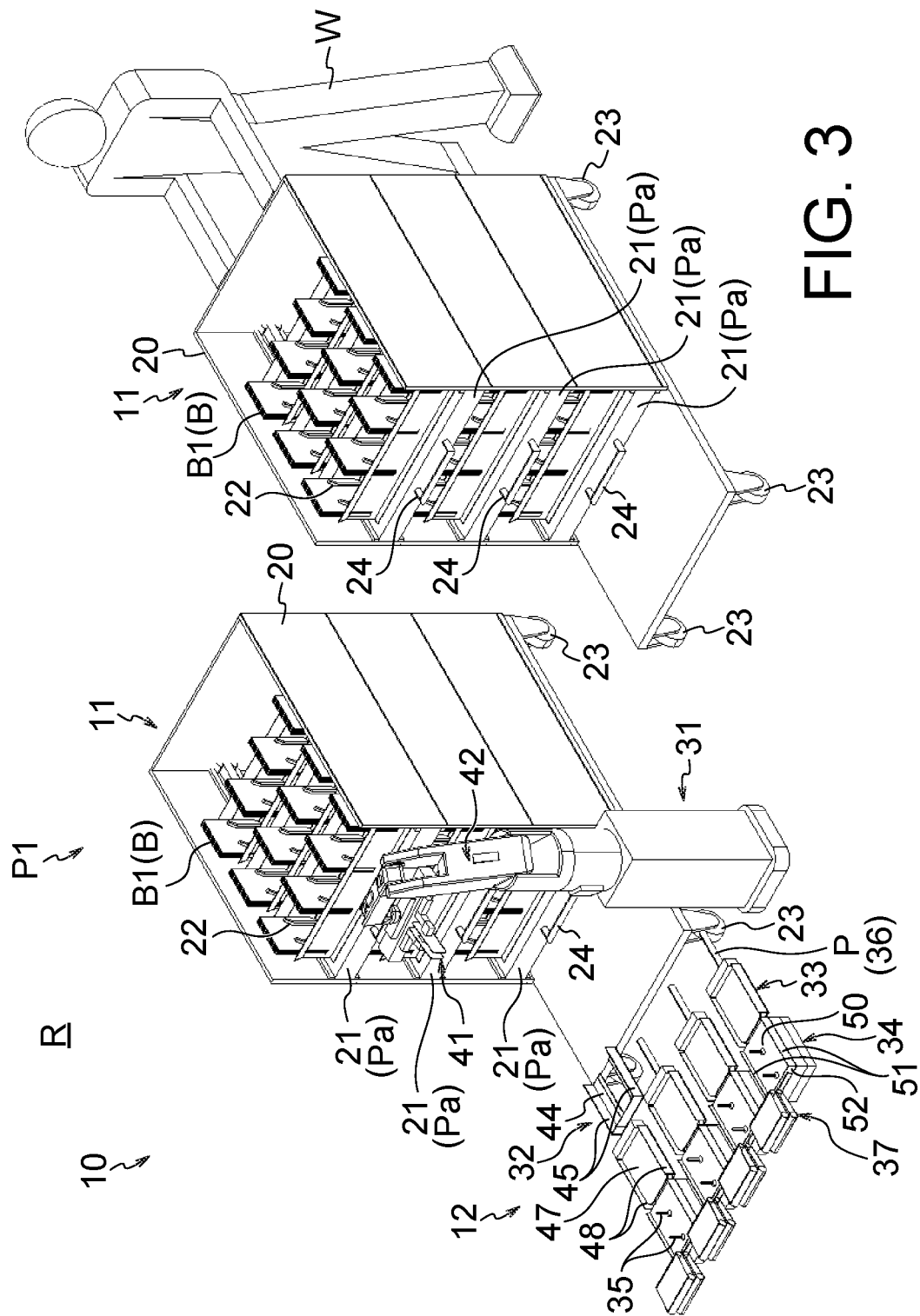
FIG. 3 is a view for describing work of setting the bag stocker storing the plurality of bag bundles to a taking-out position.
Figure 4:
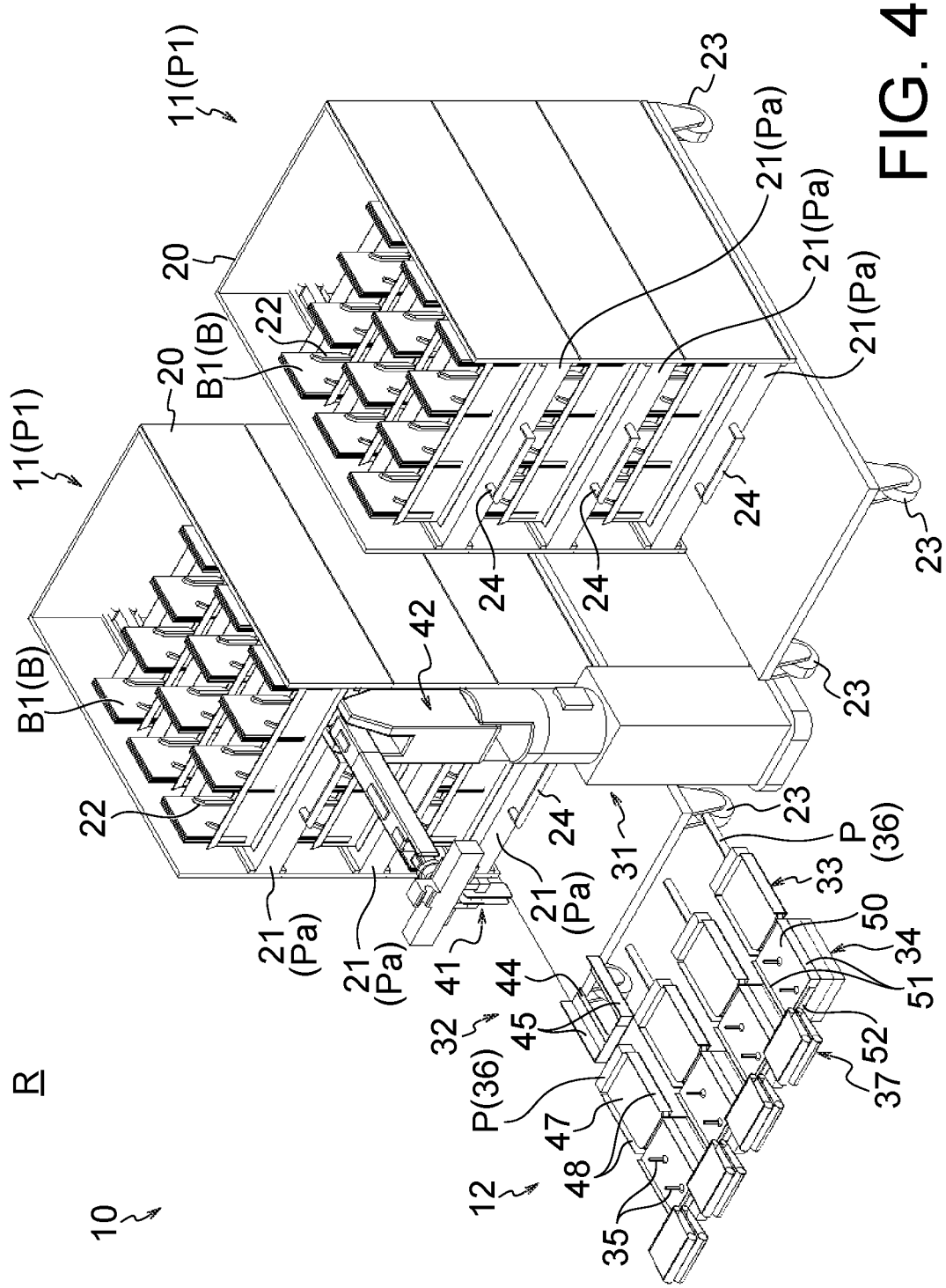
FIG. 4 is a view illustrating a state where a plurality of bag stockers are set at the taking-out position.
Figure 5:
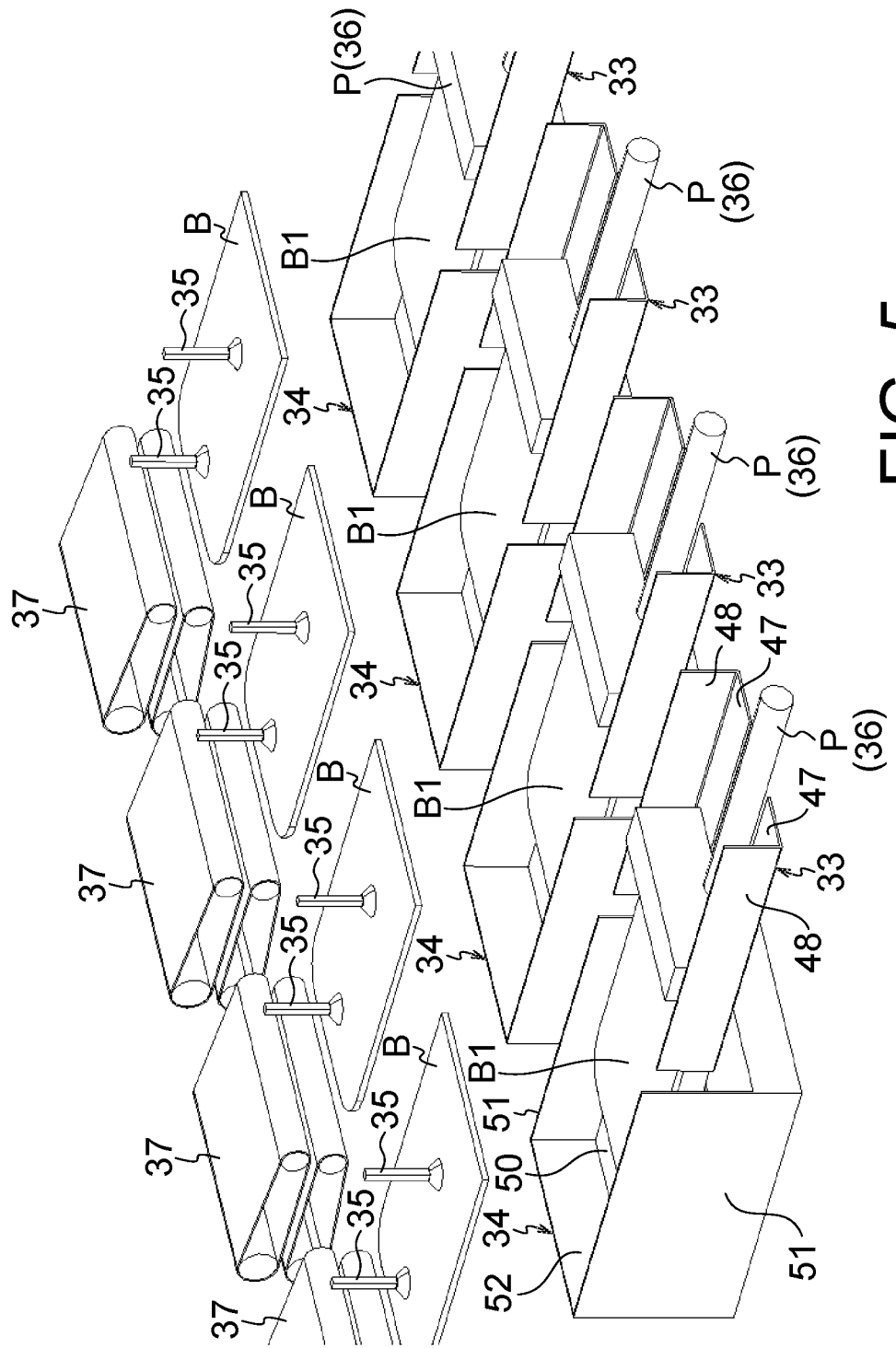
FIG. 5 is an enlarged view illustrating configuration examples of a bag transporting unit (pusher), a depositing unit, a magazine, a first bag pickup unit and a delivery unit.

FIG. 2 is a view for describing work of replenishing the plurality of bags B to the bag stocker 11 at a receiving position P2. FIG. 3 is a view for describing work of setting the bag stocker 11 storing a plurality of bag bundles B1 to a taking-out position P1. FIG. 4 is a view illustrating a state where a plurality of the bag stockers 11 are set at the taking-out position P1. FIG. 5 is an enlarged view illustrating configurations of a bag transporting unit 36 (pusher P), a depositing unit 33, a magazine 34, a first bag pickup unit 35, and a delivery unit 37.

[Bag Supply System]

The bag supply system 10 includes the bag stocker 11 and the bag supply device 12. The bag stocker 11 holds the plurality of bags B to be supplied to the bag supply device 12. In particular, the bag stocker 11 of the present embodiment serves as the moving unit that moves a bag accommodating unit 21 to a bag bundle replenishment position (that is, the receiving position P2) where the bag bundle B1 is supplied to the bag accommodating unit 21 and a bag bundle supply position (that is, the taking-out position P1) where the bag bundle B1 is taken out of the bag accommodating unit 21. The bag supply device 12 is installed inside a supply room R, and the plurality of bags B are supplied from the bag stocker 11 arranged at the bag bundle supply position (taking-out position P1). As described above, the bag supply device 12 according to the present embodiment sequentially delivers the bags B toward the bag processing device (not illustrated) such as the packaging machine that performs processing using the bag B.

[Bag Stocker]

The bag stocker 11 includes a body portion 20 that is provided to be movable between the inside (taking-out position P1) and the outside (receiving position P2) of the supply room R, and the body portion 20 supports the plurality of bag accommodating units (withdrawing portions) 21. Each of the bag accommodating units 21 includes one or a plurality of holding members 22 (the illustrated bag accommodating unit 21 includes the plurality of holding members 22) to support the bag bundle B1. Typically, the inside (taking-out position P1) and the outside (receiving position P2) of the supply room R are partitioned by a partition wall (not illustrated), and the inside of the supply room R has a structure in which a closed space can be formed. However, the inside of the supply room R is not necessarily a completely closed space, and the inside of the supply room R may communicate with the outside. Further, if the taking-out position P1 (inside of the supply room R) and the receiving position P2 (outside of the supply room R) are sufficiently separated, the inside (taking-out position P1) and the outside (receiving position P2) of the supply room R are not necessarily partitioned by the partition wall. Therefore, the taking-out position P1 and the receiving position P2 may be provided at positions separated from each other by a distance where the influence (for example, dispersion of foreign substances such as dust) exerted on the taking-out position P1 by work at the receiving position P2 (for example, replenishment work of the bag B) can be substantially ignored.

The body portion 20 includes a plurality of casters 23 (wheels) at a bottom (lower end surface). As the casters 23 are rolled on a floor surface, the entire bag stocker 11 can be freely moved between the inside (taking-out position P1) and the outside (receiving position P2) of the supply room R. Incidentally, a drive source configured to move the body portion 20 (that is, the bag stocker 11) is not limited, and a machine may be used as the drive source, or a man power of a worker W may be used as the drive source.

The plurality of bag accommodating units 21, are provided, and each of the plurality of bag accommodating units 21 is replenished with the bag B outside the supply room R. Each of the bag accommodating units 21 is supported by the body portion 20 so as to be movable between an accommodating position Pa and a withdrawing position Pb protruding from the bag accommodating unit 21, arranged at the accommodating position Pa, in the body portion 20. Each of the illustrated bag accommodating units 21 is provided to be slidable in the horizontal direction between the accommodating position Pa and the withdrawing position Pb with respect to the body portion 20. In the bag stocker 11, the plurality of bag accommodating units 21 are arranged so as to be aligned in a vertical direction (that is, in a stacking direction). A plurality of bag accommodating units 21 arranged at the accommodating position Pa are arranged at positions overlapping with each other in the vertical direction, and a plurality of bag accommodating units 21 arranged at the withdrawing position Pb are arranged at positions overlapping with each other in the vertical direction. As the plurality of bag accommodating units 21 are arranged to be aligned in the vertical direction in this manner, it is possible to form the bag stocker 11 to be compact in the horizontal direction. Further, as each of the bag accommodating units 21 is configured so as to be slidable in the horizontal direction, it is possible to move each of the bag accommodating units 21 from the accommodating position Pa to the withdrawing position Ph so as to expose a place (particularly each of the holding members 22) where the bag bundle B1 (bag B) is placed if necessary. As a result, it is possible to smoothly perform the replenishment of the plurality of bags B (the bag bundle B1) to each of the bag accommodating units 21 and the taking of the plurality of bags B (the bag bundle B1) out of each of the bag accommodating units 21.

Each of the holding members 22 is a member configured to externally support the bag bundle B1. The bag bundle B1 includes two or more bags B (in general, several to tens of bags B), and front surfaces and back surfaces of the two or more bags B included in the bag bundle B1 are directed in the same direction, and these bags B are integrally arranged to be superimposed on each other, thereby forming the bag bundle B1. In the present embodiment, each of the holding members 22 supports the bag bundle B1 in a state where the direction (that is, the normal direction) of the front surfaces and the back surfaces of the two or more bags B are directed in a direction other than a direction parallel to the vertical direction which is a gravity action direction. That is, the bag bundle B1 (that is, the two or more bags B) is supported by the holding member 22 so as to extend in a direction other than the horizontal direction. In particular, each of the holding members 22 externally supports the bag bundle B1 in the state of contacting a part of an outer surface of the bag bundle B1 without passing through the bag bundle B1. As the bag bundle B1 is externally supported in this manner, it is possible to flexibly cope with various types of the bags B (bag bundles B1) regardless of the presence or absence of a through-hole in each of the bags B. For example, it is also possible to support a plurality of types of bags B (bag bundles B1) having different sizes and shapes appropriately by using the common holding member 22. Each of the illustrated holding members 22 supports the corresponding bag B in an upright attitude. The upright attitude referred to herein is an attitude in which each of the bags B included in the bag bundle B1 extends in the substantially vertical direction, and is an attitude in which the front surface and the back surface of each of the bags B are directed in the direction other than the vertical direction. Therefore, an inclined attitude in which each of the bags B extends to be inclined with respect to both the vertical direction and the horizontal direction is also included in the upright attitude in the broad sense. Further, each of the holding members 22 of the illustrated bag stocker 11 supports the corresponding bag bundle B1 such that the mouth portions Bb of the two or more bags B included in the corresponding bag bundle B1 are directed upward in the vertical direction.

However, the direction in which the mouth portion Bb of each of the bags B included in the bag bundle B1 supported by each of the holding members 22 is directed is not limited.

Each of the holding members 22 supports the corresponding bag bundle B1 from both the front surface side and the back surface side in the state of exposing a part (particularly, a part of each of the front surface and the back surface) of the corresponding bag bundle B1. That is, each of the holding members 22 supports the bag bundle B1 in the state of exposing a part of either the front surface or the back surface (that is, a surface that is positioned opposite to a side where the adjacent bag B is arranged and directed outward between the front surface and the back surface) of each of the bag B arranged on the frontmost side and the bag B arranged on the backmost side between the two or more bags B included in the bag bundle B1. Each of the illustrated holding members 22 includes four rod-like members erected in the vertical direction, and supports the bag bundle B1 by causing a front surface side and a back surface side of one end portion of the bag bundle 31 to be sandwiched by the two rod-like members and causing a front surface side and a back surface side of the other end portion to be sandwiched by the other two rod-like members. As each of the holding members 22 supports the bag bundle 31 in the state of exposing a part of the bag bundle 31 in this manner, it is easy to grip the bag bundle B1 at the time of taking the bag bundle B1 out of the bag stocker 11.

Incidentally, each of the illustrated holding members 22 is constituted by a plurality of pins arranged apart from each other, but the configuration of each of the holding members 22 is not limited. For example, each of the holding members 22 may be configured by erecting one or two or more plate-like members, or each of the holding members 22 may be configured using a box-like member capable of accommodating the bag bundle B1. When the pins are used as each of the holding members 22 as illustrated in the drawing, each of the holding members 22 may be constituted by pins shorter than the bag bundle B1 with respect to the vertical direction in each of the bag accommodating units 21 such that an upper part of the bag bundle B1 in the upright attitude is not held by the pins, for example. Further, when the plate-like member or the box-like member is used as each of the holding members 22, each of the holding members 22 may be configured using a plate-like member or a box-like member shorter than the bag bundle B1 in the vertical direction in each of the bag accommodating units 21. Further, a cutout may be formed in the plate-like member or the box-like member forming each of the holding members 22, and a part of the corresponding bag bundle B1 may be exposed through the cutout.

Each of the bag accommodating units 21 includes a holding portion for movement 24, and the corresponding bag accommodating unit 21 is moved between the accommodating position Pa and the withdrawing position Pb as a force is applied to the holding portion for movement 24. Although the illustrated holding portion for movement 24 has the form of a so-called handle, the form of the holding portion for movement 24 is not limited, and can have an arbitrary form (for example, a convex portion, a concave portion and/or a hole portion) suitable for holding (for example, engaging) a movement device (in the present embodiment, a bag holding unit 41 of a taking-out unit 31).

When moving the plurality of bag accommodating units 21 from the bag bundle replenishment position (receiving position P2) to the bag bundle supply position (taking-out position P1), the bag stocker 11 moves the plurality of bag accommodating units in a state where at least two or more bag accommodating units among the plurality of bag accommodating units 21 are aligned in mutually vertical directions.

A plurality (preferably three or more) of the bag stockers 11 having the above-described configuration is provided. In particular, it is preferable that the bag stocker 11 allocated to the bag supply device 12 can be arranged at the taking-out position P1 while arranging the other bag stocker 11 at the receiving position P2. In this case, while the bag B is being supplied to the bag supply device 12 at the taking-out position P1, the bag B can be replenished with respect to the bag stocker 11 at the receiving position P2. Although the two bag stockers 11 can be allocated to the single bag supply device 12 in the illustrated bag supply system 10, three or more bag stockers 11 may be allocated to the single bag supply device 12, or only one bag stocker 11 may be allocated to the single bag supply device 12.

[Bag Supply Device]

The bag supply device 12 illustrated in FIGS. 3, 4, and the like is provided inside the supply room R, and the plurality of bags B are sequentially supplied from each of the plurality of bag stockers 11. That is, the plurality of bags B are supplied to the bag supply device 12 from a certain bag stocker 11 among the plurality of bag stockers 11 arranged at the taking-out position P1. When the bag B is exhausted in the certain bag stocker 11, the plurality of bags B are supplied from the other bag stocker 11 to the bag supply device 12. The bag supply device 12 includes the taking-out unit 31, an arrangement adjustment unit 32, the depositing unit 33, the bag transporting unit 36, the magazine 34, the first bag pickup unit 35, and the delivery unit 37.

[Taking-Out Unit]

The taking-out unit 31 is installed near the taking-out position P1 where the bag stocker 11 is arranged inside the supply room R, takes the bag bundle B1 out of the bag stocker 11, and carries the bag bundle B1 to the depositing unit 33. Further, the taking-out unit 31 of the present embodiment also functions as the movement device that moves the corresponding bag accommodating unit 21 from the accommodating position Pa to the withdrawing position Pb by applying a force to the holding portion for movement 24. Although the taking-out unit 31 also functions as the movement device in the present embodiment, a movement device as a separate body from the taking-out unit 31 may be provided.

The illustrated taking-out unit 31 is configured as a robot hand, and includes the bag holding unit 41 capable of holding and releasing the bag bundle B1, and a three-dimensional moving unit 42 that three-dimensionally moves the bag holding unit 41.

The illustrated bag holding unit 41 is constituted by a pair of clamping members attached to a distal end portion of the three-dimensional moving unit 42 and provided so as to be opened and closed using an air cylinder (not illustrated) as a drive source. The bag holding unit 41 of the present embodiment not only can clamp and release the bag bundle B1 but also can hold the holding portion for movement 24 of each of the bag accommodating units 21. Incidentally, the pair of clamping members configured to hold the bag bundle B1 and an engaging portion configured to hold the holding portion for movement 24 are provided as separate bodies in the illustrated bag holding unit 41.

The illustrated three-dimensional moving unit 42 is configured as an arm unit that three-dimensionally moves the bag holding unit 41. Although the illustrated three-dimensional moving unit 42 is configured using an articulated robot, a specific configuration of the three-dimensional moving unit 42 is not limited, and may be configured, for example, using another device such as a parallel link robot.

The taking-out unit 31 of the present embodiment having the above-described configuration delivers the bag bundle B1, taken out of the bag stocker 11, to the arrangement adjustment unit 32, receives the bag bundle B1 of which arrangement position has been adjusted by the arrangement adjustment unit 32 from the arrangement adjustment unit 32, and carries the bag bundle B1, received from the arrangement adjustment unit 32, to the depositing unit 33.

[Arrangement Adjustment Unit (Positioning Means)]

The arrangement adjustment unit 32 adjusts the mutual arrangement positions of the two or more bags B included in the bag bundle B1 received from the taking-out unit 31.

The illustrated arrangement adjustment unit 32 includes an arrangement adjustment placement portion 44 on which the bag bundle B1 is placed and a position adjustment member 45 which adjusts positions of the two or more bags B included in the bag bundle B1 on the arrangement adjustment placement portion 44. The arrangement adjustment placement portion 44 supports the placed bag bundle B1 in a horizontal attitude. Although a shape of the arrangement adjustment placement portion 44 is not limited, the illustrated arrangement adjustment placement portion 44 is partially cut out in order to prevent interference with the taking-out unit 31 (particularly the bag holding unit 41). The position adjustment member 45 is movably provided using an air cylinder (not illustrated) as a drive source. Specifically, the position adjustment member 45 includes a pair of side wall members, and is configured to be movable between a correction position to abut on the two or more bags B included in the bag bundle B1 on the arrangement adjustment placement portion 44 from both sides and adjust the arrangement positions of the two or more bags B, and a separation position to be separated from the two or more bags B included in the bag bundle B1 on the arrangement adjustment placement portion 44.

Incidentally, the bag bundle B1 of the present embodiment is carried from the bag stocker 11 (that is, the bag accommodating unit 21) to the depositing unit 33 via the arrangement adjustment unit 32, but the arrangement adjustment unit 32 is not necessarily provided, and the bag bundle B1 may be directly carried from the bag stocker 11 to the depositing unit 33.

[Depositing Unit]

The depositing unit 33 includes a transport placement portion 47 on which the bag bundle B1 is placed by the taking-out unit 31 and a transport guide portion 48 which guides the bag bundle B1 on the transport placement portion 47.

The transport placement portion 47 is a support member capable of supporting the bag bundle B1 supplied via the taking-out unit 31 in a horizontal attitude. The transport guide portion 48 is constituted by a pair of plate-like members guiding both side edges of the bag bundle B1 on the transport placement portion 47, and guides the bag bundle B1 toward an inside of the magazine 34 provided on the downstream side. In particular, the illustrated transport guide portion 48 contacts an edge, which is not provided with the mouth portion Bb, among the plurality of edges of the two or more bags B included in the bag bundle B1 on the transport placement portion 47 and guides the bag bundle B1. Incidentally, the transport placement portion 47 and the transport guide portion 48 have a structure that does not interfere with the bag transporting unit 36 (for example, the pusher P moving forward and backward).

[Bag Transporting Unit]

The bag transporting unit 36 transports the bag bundle B1 from the depositing unit 33 to be accommodated in the magazine 34. That is, the bag transporting unit 36 transports the bag bundle B1 on the transport placement portion 47 along the transport guide portion 48 and accommodates the bag bundle B1 in the magazine 34.

The illustrated bag transporting unit 36 is arranged to be adjacent to the depositing unit 33 and has the pusher P that pushes out the bag bundle B1 on the transport placement portion 47 toward the magazine 34. The pusher P is provided so as to be movable in the substantially horizontal direction between an escape position and a pushing-out position using an air cylinder (not illustrated) as a drive source. The pusher P arranged at the escape position is separated from the bag bundle B1 on the transport placement portion 47. Then, the pusher P moves toward the pushing-out position from the escape position, thereby pushing the bag bundle B1 on the transport placement portion 47 toward the magazine 34.

The bag supply device 12 has a configuration in which the taking-out unit 31 and other devices such as the bag transporting unit 36 (pusher P) do not interfere with each other when carrying the bag bundle B1 to the depositing unit 33 by the taking-out unit 31. The illustrated depositing unit 33 is provided so as to be movable up and down in the vertical direction by a motor (not illustrated) or the like, and can be arranged at an ascending position where the bag bundle B1 is received from the taking-out unit 31 and the bag bundle B1 is placed on the transport placement portion 47 or at a descending position where the bag bundle B1 on the transport placement portion 47 is pushed out toward the magazine 34 by the bag transporting unit 36 (pusher P).

Incidentally, the bag supply device 12 can adopt other arbitrary configurations for preventing unintentional interference between the taking-out unit 31 and the bag transporting unit 36 (pusher P), or the like. For example, when the bag bundle B1 is carried to the depositing unit 33 by the taking-out unit 31, the pusher P (bag transporting unit 36) may be arranged at the escape position where a space, which enables the taking-out unit 31 (particularly, the bag holding unit 41) to be arranged at a position adjacent to the depositing unit 33, is provided.

[Magazine]

The magazine 34 is arranged to be adjacent to the depositing unit 33 and holds the accommodated bag bundle B1 to be movable up and down. The illustrated magazine 34 includes: a magazine placement portion 50 that supports the bag bundle B1 fed from the depositing unit 33 by the bag transporting unit 36 (that is, the pusher P) in a horizontal attitude; a pair of magazine guide portions 51 that guides both side edges of the bag bundle B1 on the magazine placement portion 50 so as to freely ascend; and a magazine stopper 52 that regulates movement of the bag bundle B1 caused by the bag transporting unit 36 (pusher P). The magazine placement portion 50 is provided so as to be movable up and down using a servo motor (not illustrated) as a drive source, and can make a vertical position of a bag B at the uppermost position between the two or more bags B included in the accommodated bag bundle B1 substantially the same at all times. Therefore, the magazine placement portion 50 gradually ascends as the bag B is taken out of the magazine 34. Further, when a new bag bundle B1 is supplied to the magazine 34, the magazine placement portion 50 descends and a space configured to arrange the new bag bundle B1 is formed in the magazine 34.

Incidentally, it suffices that it is possible to form a space having a size corresponding to at least one bag bundle B1 in the magazine 34, and it is also possible to form a space having a size corresponding to the plurality of bag bundles B1. As the magazine 34 enables formation of the space having the size corresponding to the plurality of bag bundles B1, it is possible to continuously perform the process of conveying the bag B from the magazine 34 to the subsequent stage using the first bag pickup unit 35 without interruption for a long time. Therefore, while the plurality of bags B in the magazine 34 are being conveyed to the subsequent stage by the first bag pickup unit 35, it is also possible to finish carrying the new bag bundle B1 from the bag stocker 11 to the depositing unit 33, so that it is possible to efficiently carry the bag bundle B1 (bags B). Incidentally, the magazine 34 illustrated in FIGS. 2 to 5 can form a space capable of accommodating three bag bundles B1.

[First Bag Pickup Unit and Delivery Unit]

The first bag pickup unit 35 takes out the two or more bags B included in the bag bundle B1 accommodated in the magazine 34 one by one, and specifically, takes out the bag B arranged at the uppermost position of the bag bundle B1 one piece at a time. The first bag pickup unit 35 can be configured using, for example, a sucker or the like. In the bag supply device 12 illustrated in FIGS. 2 to 5, the bag B taken out by the first bag pickup unit 35 is delivered to the delivery unit 37 and fed to the subsequent stage by the delivery unit 37.

Incidentally, the delivery unit 37 is not necessarily provided, and the first bag pickup unit 35 may directly deliver the bag B to the subsequent device or the like, or the bag B may be fed to the subsequent stage from the first bag pickup unit 35 via a device or the like other than the delivery unit 37.

Only one set of the bag transporting unit 36 (pusher P), the depositing unit 33, magazine 34, the first bag pickup unit 35, and the delivery unit 37 described above may be provided, or a plurality of the sets may be provided. The bag supply device 12 illustrated in FIGS. 3 to 5 includes the four sets, and the number of each of the bag transporting units 36 (pushers P), the depositing units 33, the magazines 34, the first bag pickup units 35, and the delivery units 37 is four.

[Bag Supply Method]

Next, the bag supply method performed using the above-described bag supply system 10 will be described.

The bag supply method of the present embodiment includes a step of replenishing the plurality of bags B to the bag stocker 11 and a step of supplying the plurality of bags B from the bag stocker 11 to the bag supply device 12. In particular, in the illustrated bag supply system 10, the plurality of bags B are replenished to the bag stocker 11 outside the supply room R, and the plurality of bags B are supplied to the bag supply device 12 from the bag stocker 11 inside the supply room R.

The plurality of bags B replenished to the bag stocker 11 are stored in the form of the bag bundle B1 supported by the plurality of holding members 22 in each of the plurality of bag accommodating units 21. Then, each of the plurality of bags B to be supplied from the bag stocker 11 to the bag supply device 12 is the bags B included in the bag bundle B1 taken out of each of the plurality of holding members 22.

Hereinafter, each step included in the bag supply method will be described.

[Bag Group Supply Step]

A step of replenishing the plurality of bags B to the bag stocker 11 include: a step of sequentially moving the plurality of bag accommodating units 21 from the accommodating position Pa to the withdrawing position Pb in the body portion 20; a step of supplying the plurality of bags B to the bag accommodating unit 21 arranged at the withdrawing position Pb and supporting each of the plurality of bags B as the bag bundle B1 by each of the plurality of holding members 22; and a step of moving the bag accommodating unit 21 in a state where each of the plurality of corresponding holding members 22 supports the bag bundle B1 from the withdrawing position Pb to the accommodating position Pa (see FIG. 2).

Specifically, the plurality of bags B are replenished to the bag stocker 11 as follows.

A first step: A predetermined number (for example, any of one to three) of bag stockers 11 are stopped and arranged at the predetermined receiving position P2 outside the supply room R. At this time, each of the bag accommodating units 21 is arranged at the accommodating position Pa and is in an empty state where the bag B is not stored.

A second step: The bag accommodating unit 21 as a target to which a new bag B is supplied is moved from the accommodating position Pa to the withdrawing position Pb. At this time, the movement of the target bag accommodating unit 21 may be performed by the worker W, or may be performed by a machine (not illustrated).

A third step: The plurality of bags B are replenished to the bag accommodating unit 21 arranged at the withdrawing position Pb, and the plurality of bags B are supported in the form of the bag bundle B1 by the holding members 22 in the upright attitude. At this time, the replenishment of the plurality of bags B may be performed by the worker W, or may be performed by a machine (not illustrated). When the plurality of bags B are replenished by the worker W, for example, the worker W may take an arbitrary number of bags B out of a cardboard box 25 accommodating a large amount of the bags B and appropriately accommodate the bags B in each of the bag accommodating units 21 in the form of the bag bundle 31.

A fourth step: The bag accommodating unit 21 to which a predetermined number of bag bundles B1 has been replenished is moved from the withdrawing position Ph to the accommodating position Pa. At this time, the movement of the target bag accommodating unit 21 may be performed by the worker W, or may be performed by a machine (not illustrated).

The above first to fourth steps are performed with respect to all the bag accommodating units 21 of the bag stocker 11, and the plurality of bag bundles B1 are accommodated in all of the bag accommodating units 21. In this manner, the replenishment of the plurality of bags B to the single bag stocker 11 is performed.

Incidentally, when there are two or more bag stockers 11 for which the replenishment of the plurality of bags B is necessary, the above-described series of steps is performed for each of the bag stockers 11.

[Bag Stocker Movement Step]

The bag stocker 11 for which the replenishment of the plurality of bags B has been completed is moved on the floor from the predetermined receiving position P2 and stopped at the predetermined taking-out position P1 inside the supply room R (see FIGS. 2 and 3). At this time, the movement of the bag stocker 11 may be performed by the worker W, or may be performed by a machine (not illustrated).

Next, a step of supplying the plurality of bags B from the bag stocker 11 to the bag supply device 12 will be described. FIGS. 6 to 9 are views for describing the step of supplying the plurality of bags B from the bag stocker 11 to the bag supply device 12.

[Withdrawing Portion Withdrawal Step]

Figure 6:
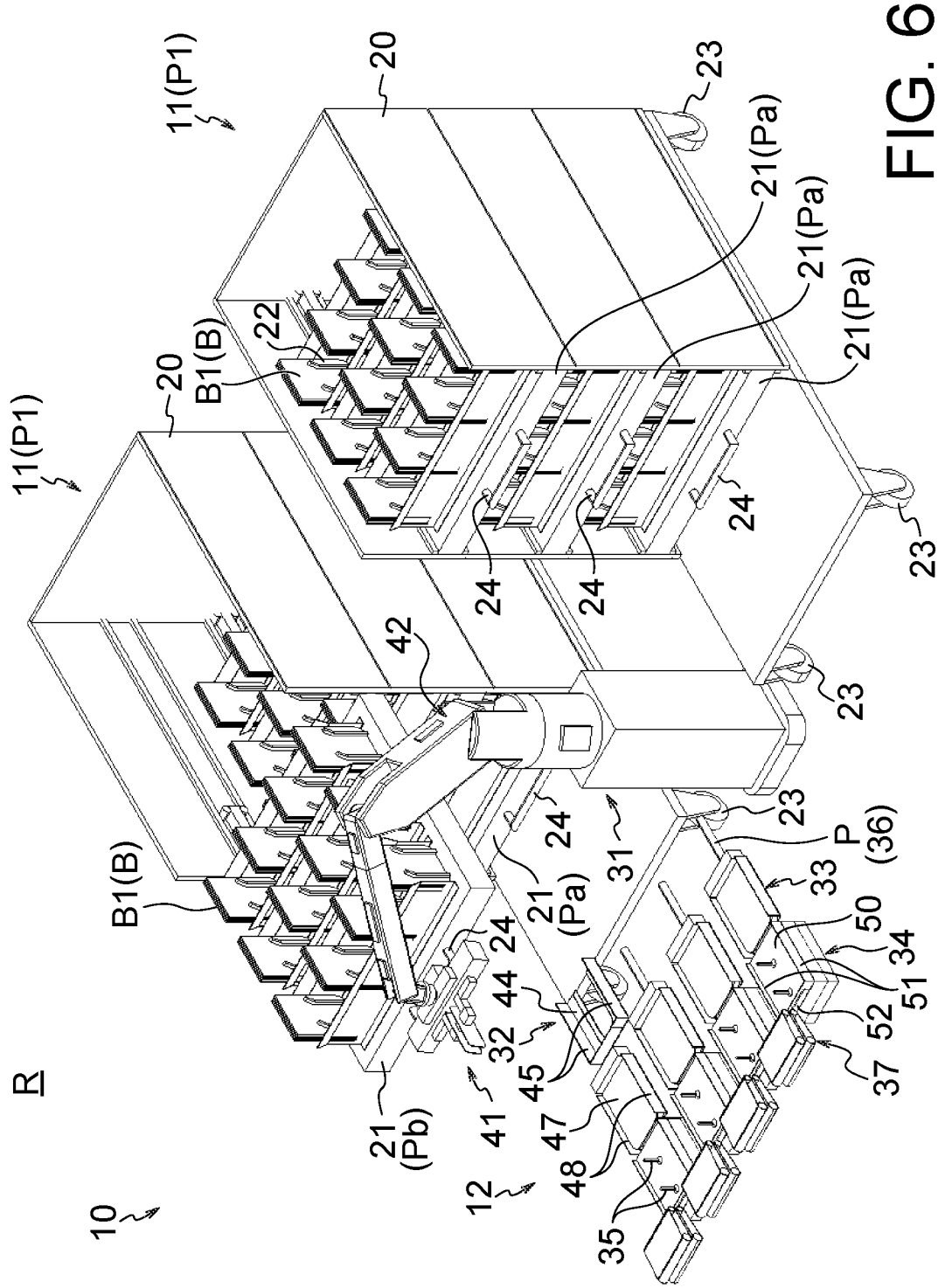
FIG. 6 is a view for describing a step of supplying the plurality of bags from the bag stocker to a bag supply device.

The step of supplying the plurality of bags B from the bag stocker 11 to the bag supply device 12 includes a step of causing the movement device to apply a force to the holding portion for movement 24 so as to move the corresponding bag accommodating unit 21 from the accommodating position Pa to the withdrawing position Pb (see FIG. 6). In the illustrated device, the bag holding unit 41 of the taking-out unit 31 serving as the movement device is held (engaged) by the holding portion for movement 24, and the bag holding unit 41 is moved by the three-dimensional moving unit 42 to apply the force to the holding portion for movement 24 so as to move the corresponding bag accommodating unit 21 from the accommodating position Pa to the withdrawing position Pb.

After the corresponding bag accommodating unit 21 has been moved to the withdrawing position Pb, the holding of the bag holding unit 41 with respect to the holding portion for movement 24 is released, and the bag holding unit 41 is separated from the holding portion for movement 24.

[Bag Group Taking-Out Step]

Figure 7:
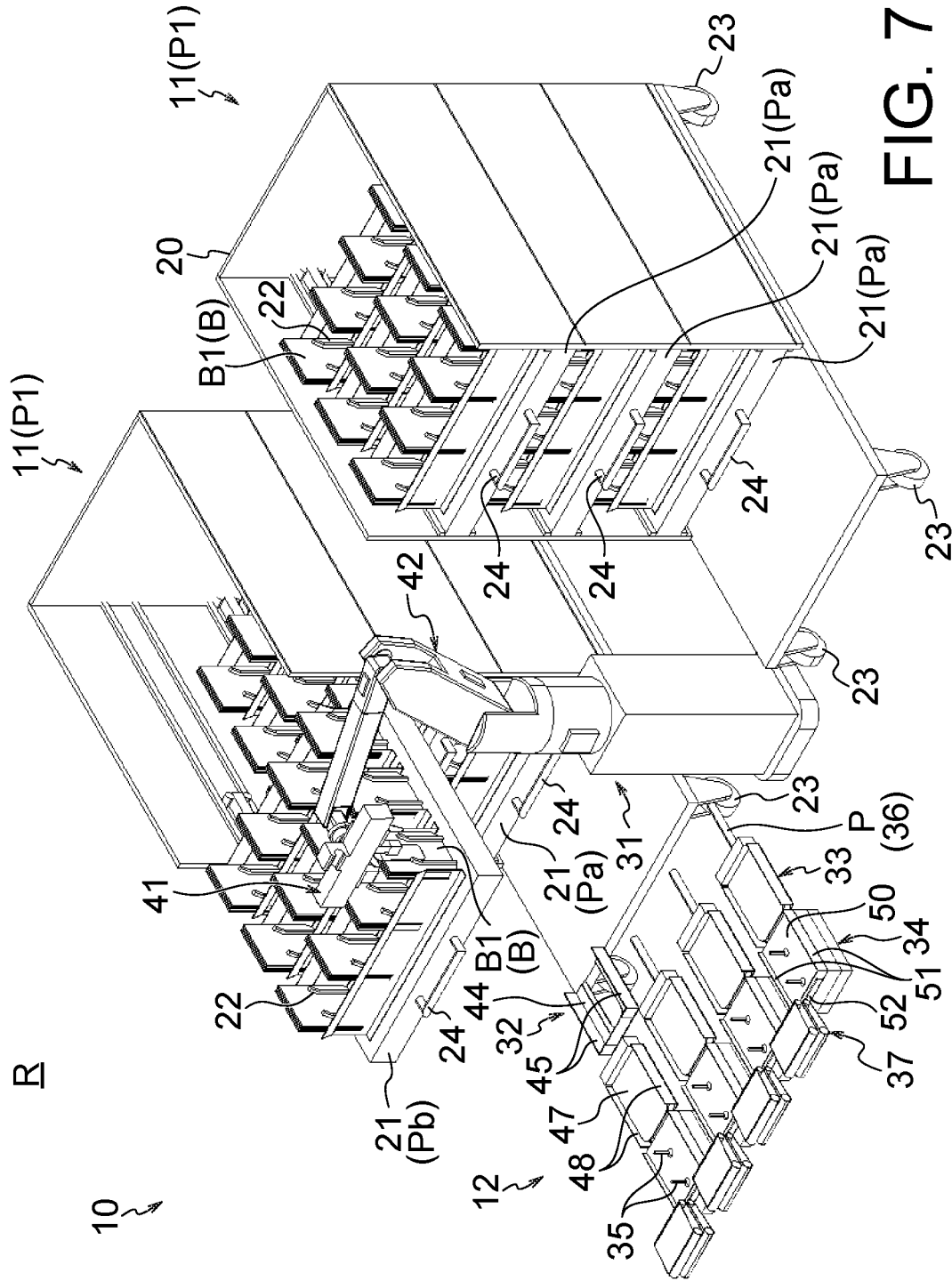
FIG. 7 is a view for describing the step of supplying the plurality of bags from the bag stocker to the bag supply device.
Figure 8:
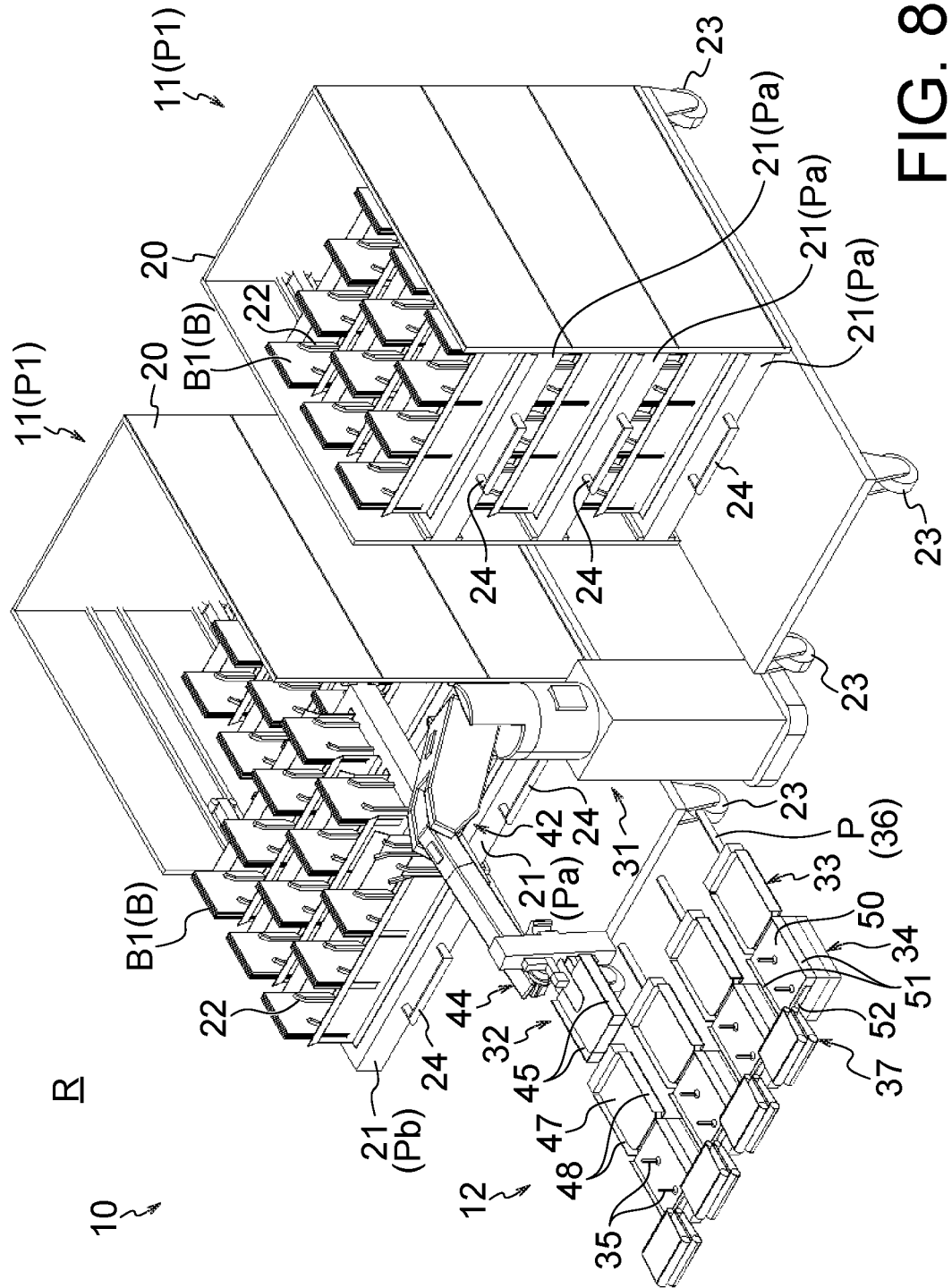
FIG. 8 is a view for describing the step of supplying the plurality of bags from the bag stocker to the bag supply device.
Figure 9:
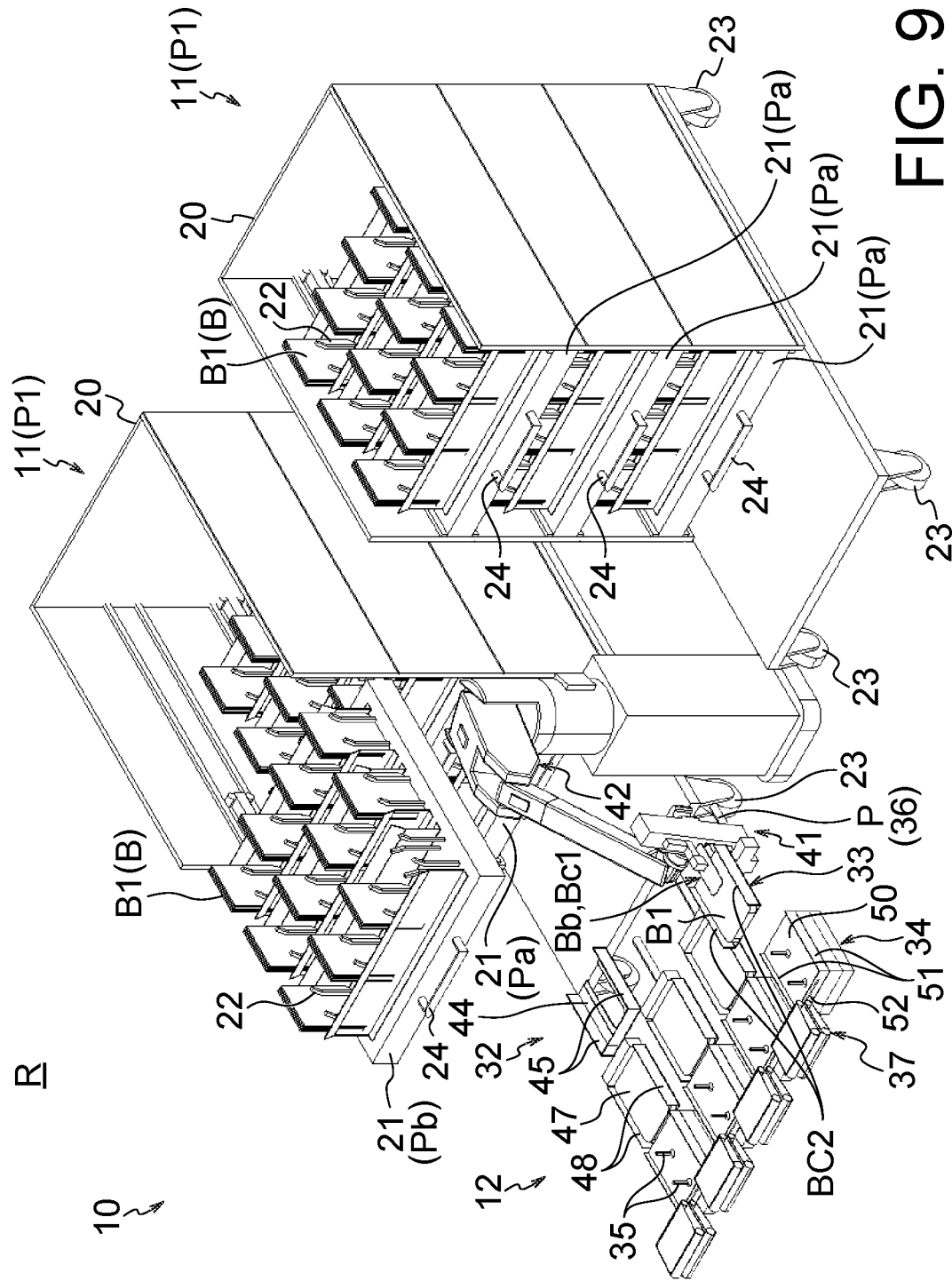
FIG. 9 is a view for describing the step of supplying the plurality of bags from the bag stocker to the bag supply device.

The taking-out unit 31 causes the bag bundle B1 stored in the bag accommodating unit 21 arranged at the withdrawing position Ph to be sandwiched by the bag holding unit 41 to hold the bag bundle B1 (see FIG. 7). The three-dimensional moving unit 42 moves the bag holding unit 41 in the state where the hag bundle B1 is held by the bag holding unit 41. In this manner, the bag bundle B1 is taken out of the bag stocker 11 (that is, the bag accommodating unit 21).

[Bag Group Positioning Step]

The step of supplying the plurality of bags B from the bag stocker 11 to the bag supply device 12 includes: a step (see FIG. 8) of delivering the bag bundle B1 taken out of the bag stocker 11 by the taking-out unit 31 to the arrangement adjustment unit 32; a step of causing the arrangement adjustment unit 32 to adjust the arrangement position of the bag bundle B1; and a step (see FIG. 9) of causing the taking-out unit 31 to receive the bag bundle B1 of which arrangement position has been adjusted by the arrangement adjustment unit 32 from the arrangement adjustment unit 32 and to carry the received bag bundle B1 to the depositing unit 33.

That is, the bag bundle B1 held by the bag holding unit 41 is arranged above the arrangement adjustment placement portion 44 in the horizontal attitude, and the bag bundle B1 is released from the bag holding unit 41 to be placed on the arrangement adjustment placement portion 44. At this time, the position adjustment member 45 is arranged at the separation position separated from the bag bundle B1 on the arrangement adjustment placement portion 44, and the operation of placing the bag bundle B1 onto the arrangement adjustment placement portion 44 is not inhibited by the position adjustment member 45.

Then, the position adjustment member 45 is moved from the separation position to the correction position so that positions of both side edges of the two or more bags B included in the bag bundle B1 on the arrangement adjustment placement portion 44 are aligned. Such movement of the position adjustment member 45 from the separation position to the correction position may be performed only once or may be repeated a plurality of times.

Then, after the position adjustment of the bag bundle B1 on the arrangement adjustment placement portion 44 has been performed, the position adjustment member 45 is arranged at the separation position, and the bag bundle B1 on the arrangement adjustment placement portion 44 is held again by the bag holding unit 41 of the taking-out unit 31. Incidentally, while the position adjustment of the bag bundle B1 is being performed in the arrangement adjustment unit 32, the bag holding unit 41 may be arranged at the same position, or may be kept at a position released to place the bag bundle B1 on the arrangement adjustment placement portion 44. Then, the bag holding unit 41 is moved from the arrangement adjustment unit 32 toward the depositing unit 33 by the three-dimensional moving unit 42 while holding the bag bundle B1 by the bag holding unit 41. The bag bundle B1 is arranged on the transport placement portion 47 of the depositing unit 33 in the horizontal attitude, and released from the bag holding unit 41 to be placed on the transport placement portion 47.

At this time, the depositing unit 33 ascends and receives the bag bundle B1 from the taking-out unit 31 (that is, the bag holding unit 41) at the ascending position. After the bag bundle B1 is placed on the transport placement portion 47, the depositing unit 33 descends together with the bag bundle B1, and the depositing unit 33 is arranged at the descending position where the baa bundle B1 on the transport placement portion 47 is substantially at the same vertical position as the pusher P. Meanwhile, the bag transporting unit 36 (that is, the pusher P) is arranged at a standby position, and does not inhibit the movement of the bag bundle B1 onto the transport placement portion 47.

Incidentally, when the arrangement adjustment unit 32 is not provided, the bag bundle B1 may be directly carried from the bag stocker 11 (the bag accommodating unit 21) to the depositing unit 33 (the transport placement portion 47) by the taking-out unit 31.

After the bag bundle B1 is delivered from the taking-out unit 31 to the depositing unit 33, the taking-out unit 31 moves so as to take out the other bag bundle B1 stored in the bag stocker 11. Then, the above-described bag group taking-out step and bag group positioning step are performed with respect to the other bag bundle B1, and the other bag bundle B1 is carried to the depositing unit 33.

[Bag Group Pushing-Out Step]

The bag bundle B1 placed on the transport placement portion 47 is withdrawn in the horizontal direction toward the downstream magazine 34 by the bag transporting unit 36. Specifically, as the pusher P is moved from the standby position to the pushing-out position, the bag bundle B1 on the transport placement portion 47 on a movement path thereof is pushed out to the magazine 34. At this time, the magazine placement portion 50 is arranged at the same position as the transport placement portion 47 or at a position lower than the transport placement portion 47 with respect to the vertical direction so that the bag bundle B1 pushed out from above the transport placement portion 47 is smoothly placed on the magazine placement portion 50. In particular, when the other bag bundle B1 has been already placed on the magazine placement portion 50, the vertical position of the magazine placement portion 50 is adjusted such that the uppermost surface of the other bag bundle B1 is arranged at the same position as the transport placement portion 47 or the position lower than the transport placement portion 47.

After the bag bundle B1 has been placed on the magazine 34, the pusher P moves from the pushing-out position to the standby position and stands by at the standby position.

[Bag Supply Step]

The step of supplying the plurality of bags B from the bag stocker 11 to the bag supply device 12 includes a step of causing the first bag pickup unit 35 to take out the bag B arranged at the uppermost position of the bag bundle B1 accommodated in the magazine 34.

The illustrated first bag pickup unit 35 has a sucker, and the bag B at the uppermost position of the bag bundle B1 supported by the magazine 34 is sucked by the sucker to be taken out upward. A suction operation and a suction-releasing operation of the sucker of the first bag pickup unit 35 are controlled by a control portion (not illustrated).

Incidentally, the magazine placement portion 50 ascends along with the taking-out of the bag B by the first bag pickup unit 35. As a result, it is possible to keep the vertical position of the bag B arranged at the uppermost position of the bag bundle 31 supported by the magazine 34 substantially constant. Therefore, the first bag pickup unit 35 can hold the bag B at a substantially fixed position and take out the bag B from the magazine 34, and thus, it is possible to simplify the operation of the first bag pickup unit 35 and to improve the holding accuracy of the bag B.

The first bag pickup unit 35 delivers the bag B taken out of the magazine 34 to the delivery unit 37, and the delivery unit 37 feeds the bag B toward a device at the subsequent stage. Incidentally, a specific configuration of the delivery unit 37 is not limited. The illustrated delivery units 37 are arranged side by side in the vertical direction such that two sets of endless belts wound around two drive rollers face each other. The first bag pickup unit 35 supplies the bag B from the magazine 34 between these endless belts of the delivery unit 37. As these endless belts are run by the drive rollers in a state where the bag B is sandwiched between the endless belts of the delivery unit 37, the bag B is conveyed toward the downstream side.

[Remarks]

Incidentally, various patterns of configurations and steps at the subsequent stages of the magazine 34 are conceivable, and are not limited. Typical examples of configurations and steps at the subsequent stages of the magazine 34 will be described later as application examples.

Further, the above-described bag group taking-out step to the bag group positioning step are performed while performing the above-described bag group pushing-out step and the subsequent steps (a step including the bag group pushing-out step and the bag supply step), and the other bag bundle B1 can be carried from the bag stocker 11 to the depositing unit 33 while a certain bag bundle B1 is being conveyed from the depositing unit 33 toward the downstream side.

Further, when all the bag bundles B1 are taken out of a certain bag accommodating unit 21 in the bag group taking-out step, the bag accommodating unit 21 is moved from the withdrawing position Pb to the accommodating position Pa by the taking-out unit 31 (that is, the movement device). Then, the above-described withdrawing portion withdrawal step and bag group taking-out step are performed with respect to the other bag accommodating unit 21 accommodating the bag bundle B1. Then, the above-described withdrawing portion withdrawal step and bag group taking-out step are performed for all the bag accommodating units 21 of the bag stocker 11. After the withdrawing portion withdrawal step and the bag group taking-out step have been performed for all the bag accommodating units 21 of one bag stocker 11, the withdrawing portion withdrawal step and bag group taking-out step are performed with respect to another bag stocker 11. Incidentally, the bag stocker 11, which has become empty after all the bag bundles B1 have been taken out, is moved from the taking-out position P1 inside the supply room R to the receiving position P2 outside the supply room R, and is replenished with a plurality of new bags B as the above-described bag group supply step is performed at the receiving position P2. At this time, the movement of the empty bag stocker 11 may be performed by the worker W or performed by a machine (not illustrated).

Incidentally, the taking-out unit 31 may take out the plurality of bag bundles B1 stored in the bag stocker 11 (particularly, each of the bag accommodating units 21) in a predetermined order. Further, the taking-out unit 31 may take out each of the bag bundles B1 based on a detection result of a sensor (for example, including an optical sensor and an imaging device) capable of detecting a position and/or the presence or absence of each of the bag bundles B1 in the bag stocker 11 (that is, each of the bag accommodating units 21).

Further, the bag supply device 12 may include a sensor capable of detecting a position of each of the bag accommodating units 21 with respect to the body portion 20, the presence or absence of the bag bundle B1 in the arrangement adjustment unit 32, the presence or absence of the bag bundle B1 in the depositing unit 33, a state of the bag transporting unit 36 (for example, a position of the pusher P), and/or the presence or absence of the bag bundle B1 in the magazine 34. Further, the bag supply device 12 may include a control unit (not illustrated) that controls at least one or more behaviors among the taking-out unit 31, the arrangement adjustment unit 32, the depositing unit 33, the bag transporting unit 36, the magazine 34, the first bag pickup unit 35, and the delivery unit 37 based on information on detection results sent from various sensors and the like.

According to the bag supply system 10 and the bag supply method of the present embodiment, it is possible to easily take the bag bundle B1 configured using the set of the plurality of bags B out of the bag accommodating unit 21 as described above. Further, it is possible to reduce the damage of the bag B at the time of taking out the bag bundle B1 and to flexibly cope with various types of bags according to the bag supply system 10 and the bag supply method of the present embodiment.

Further, it is possible to save labor and improve work efficiency while preventing the supply room R from being contaminated according to the bag stocker 11, the bag supply device 12, and the bag supply system 10 of the present embodiment. That is, the contamination of the supply room R can be prevented by replenishing the new bag B outside the supply room by using the movable bag stocker 11. Further, while the bag B is being taken out of one bag stocker 11, the new bag B can be replenished to another bag stocker 11 by using the plurality of bag stockers 11, and thus, it is possible to improve the work efficiency.

Further, it is possible to supply the bag B without intervention of a person within a movable range of a machine such as the taking-out unit 31 by using the bag stocker 11, and thus, the high-level safety can be secured.

Further, it is possible to stock a large amount of the bags B by providing the plurality of bag accommodating units 21 in the single bag stocker 11. Thus, it is possible to suppress the frequency of moving the bag stocker 11, which needs to be replenished with the new bag B, to the receiving position P2, and to remarkably mitigate the burden on the worker W.

Further, the arrangement positions of the two or more bags B included in each of the bag bundles B1 are corrected by the arrangement adjustment unit 32, there is no problem even if the positions of the bag bundle B1 (that is, the bags B) are somewhat nonuniform in the bag stocker 11. Therefore, a space defined by each of the holding members 22 may be set to be larger than the size of the bag bundle B1. In this case, it is possible to smoothly perform the replenishment work of the bag bundle B1 to each of the bag accommodating units 21 and each of the holding members 22, and further, it is possible to use the same holding member 22 and bag accommodating unit 21 even if sizes of each of the bags B and each of the bag bundles B1 are changed.

Next, the application examples of the above-described bag stocker 11 (particularly, typical configuration examples on the downstream side of the magazine 34) will be described. Incidentally, the same or similar components as those of the above-described bag supply system 10 will be denoted by the same reference signs in the respective drawings illustrating the following application examples, and the detailed description thereof will be omitted.

FIRST APPLICATION EXAMPLE

Figure 10:
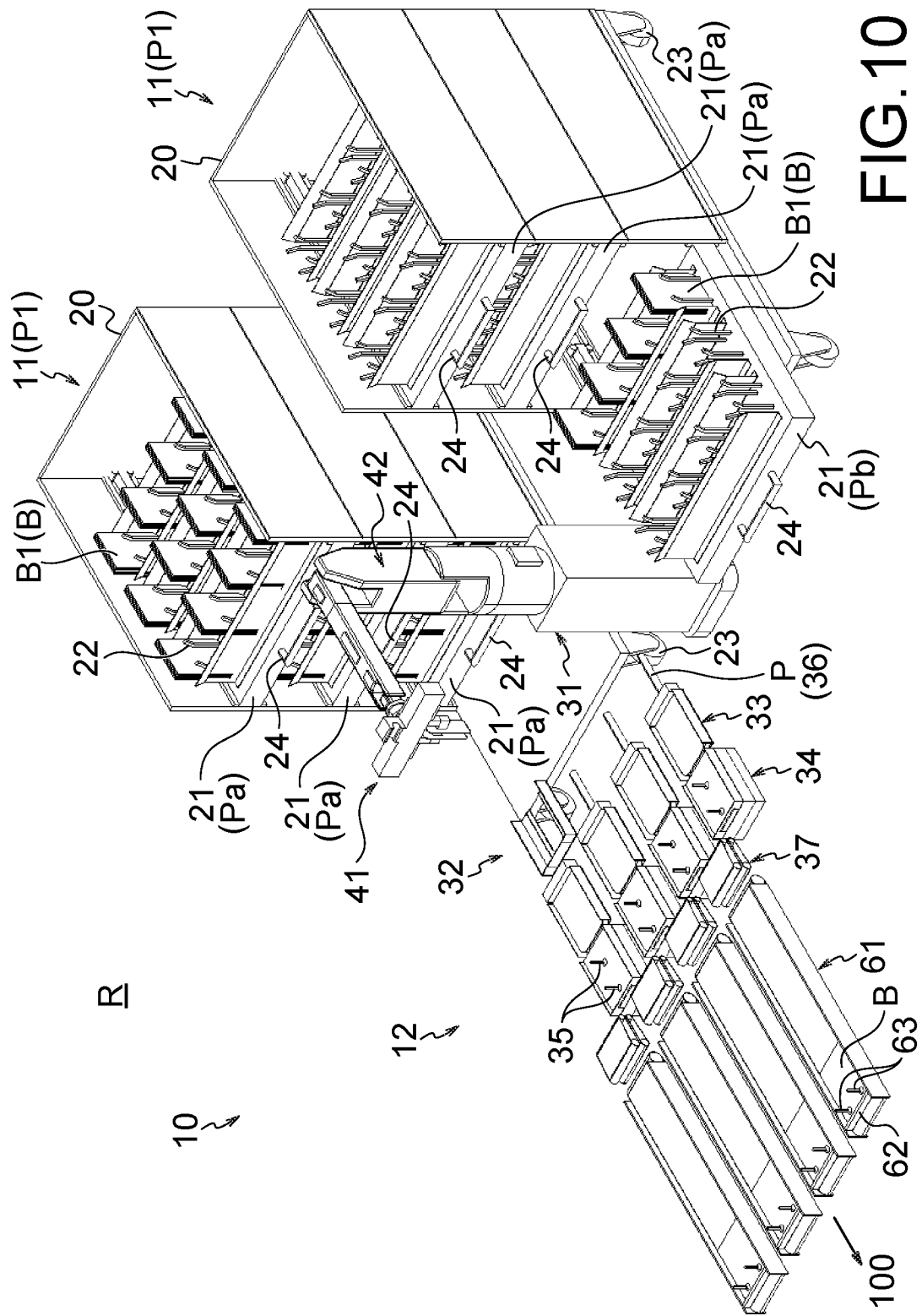
FIG. 10 is a view illustrating a bag supply system according to a first application example.

FIG. 10 is a view illustrating a bag supply system 10 according to a first application example.

A bag supply device 12 according to the present application example includes: a bag conveying unit 61 that receives a bag B fed via a first bag pickup unit 35 and conveys the bag B toward the downstream side; a conveyance stopper 62 that regulates a position of the bag B conveyed by the bag conveying unit 61; and a second bag pickup unit 63 that takes out the bag B of which position is regulated by the conveyance stopper 62 and supplies the bag B to a bag processing device 100.

The bag B taken out of a magazine 34 by the first bag pickup unit 35 is delivered to the bag conveying unit 61 having an endless conveyor belt via a delivery unit 37. The bag conveying unit 61 conveys the bags B from the first bag pickup unit 35 one by one toward the downstream side by the conveyor belt.

The bag B conveyed toward the downstream side by the bag conveying unit 61 is positioned by the conveyance stopper 62 in the vicinity of a distal end portion of the conveyor belt. The bag B positioned by the conveyance stopper 62 is taken out by the second bag pickup unit 63 and is supplied to the bag processing device 100 (not illustrated) (for example, a bag transporting machine, a bag-filling and packaging machine, a spout sealing machine, or the like) provided at the subsequent stage.

Incidentally, the number of sets of the bag conveying unit 61, the conveyance stopper 62, and the second bag pickup unit 63 is the same as the number of sets of the magazine 34, the first bag pickup unit 35, and the delivery unit 37. The illustrated bag supply device 12 is provided with four sets of the bag conveying unit 61, the conveyance stopper 62, and the second bag pickup unit 63.

SECOND APPLICATION EXAMPLE

Figure 11:
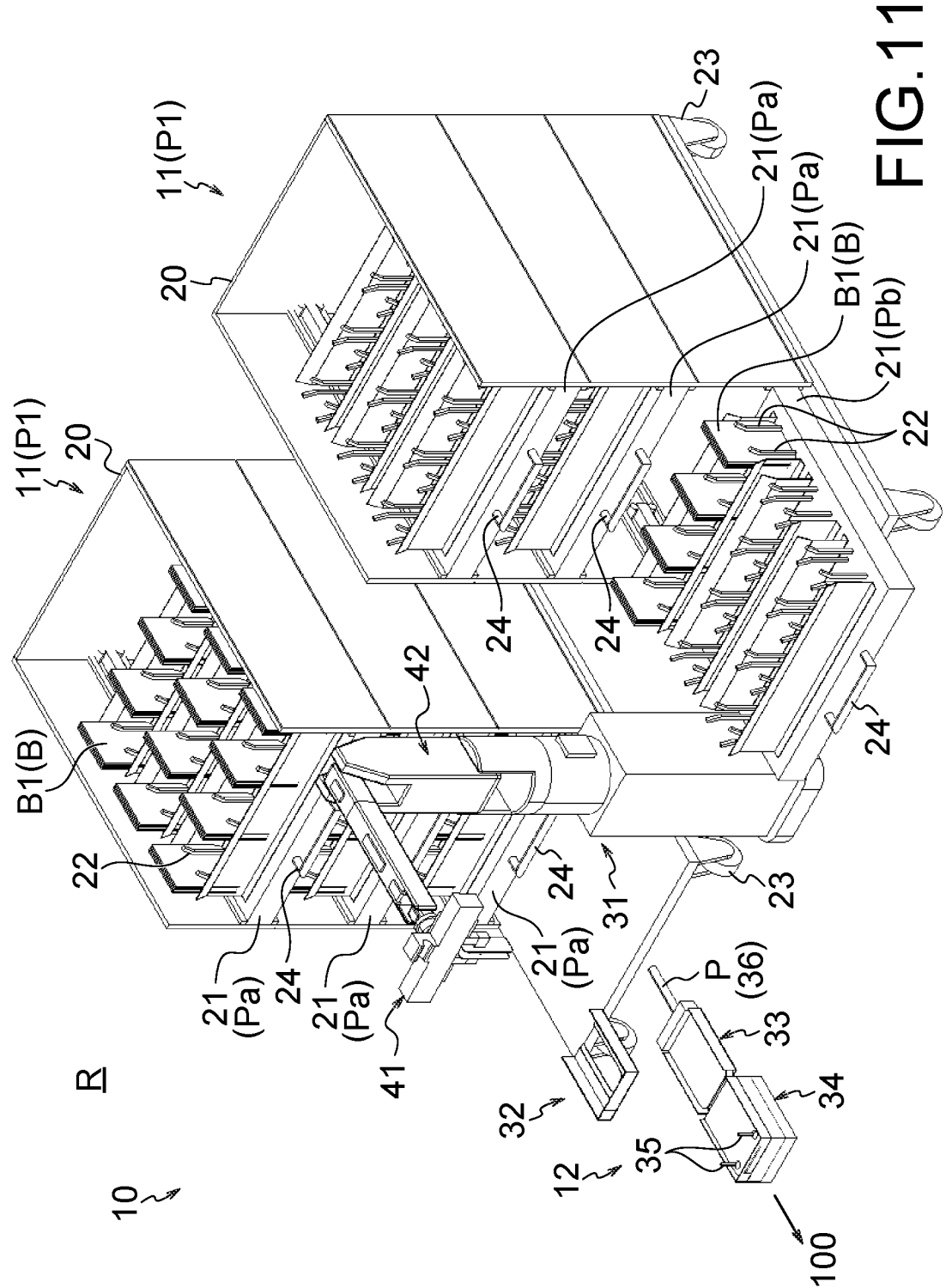
FIG. 11 is a view illustrating a bag supply system according to a second application example.

FIG. 11 is a view illustrating a bag supply system 10 according to a second application example.

A first bag pickup unit 35 of the present application example directly supplies a bag B taken out of a magazine 34 to a bag processing device 100. That is, a bag supply device 12 according to the present application example is not provided with a delivery unit 37, and the bag B stored in the magazine 34 is directly delivered to the bag processing device 100 (not illustrated) by the first bag pickup unit 35.

Incidentally, the illustrated bag supply device 12 is provided with only one set of a bag transporting unit 36 (pusher P), a depositing unit 33, the magazine 34, and the first bag pickup unit 35.

THIRD APPLICATION EXAMPLE

Figure 12:
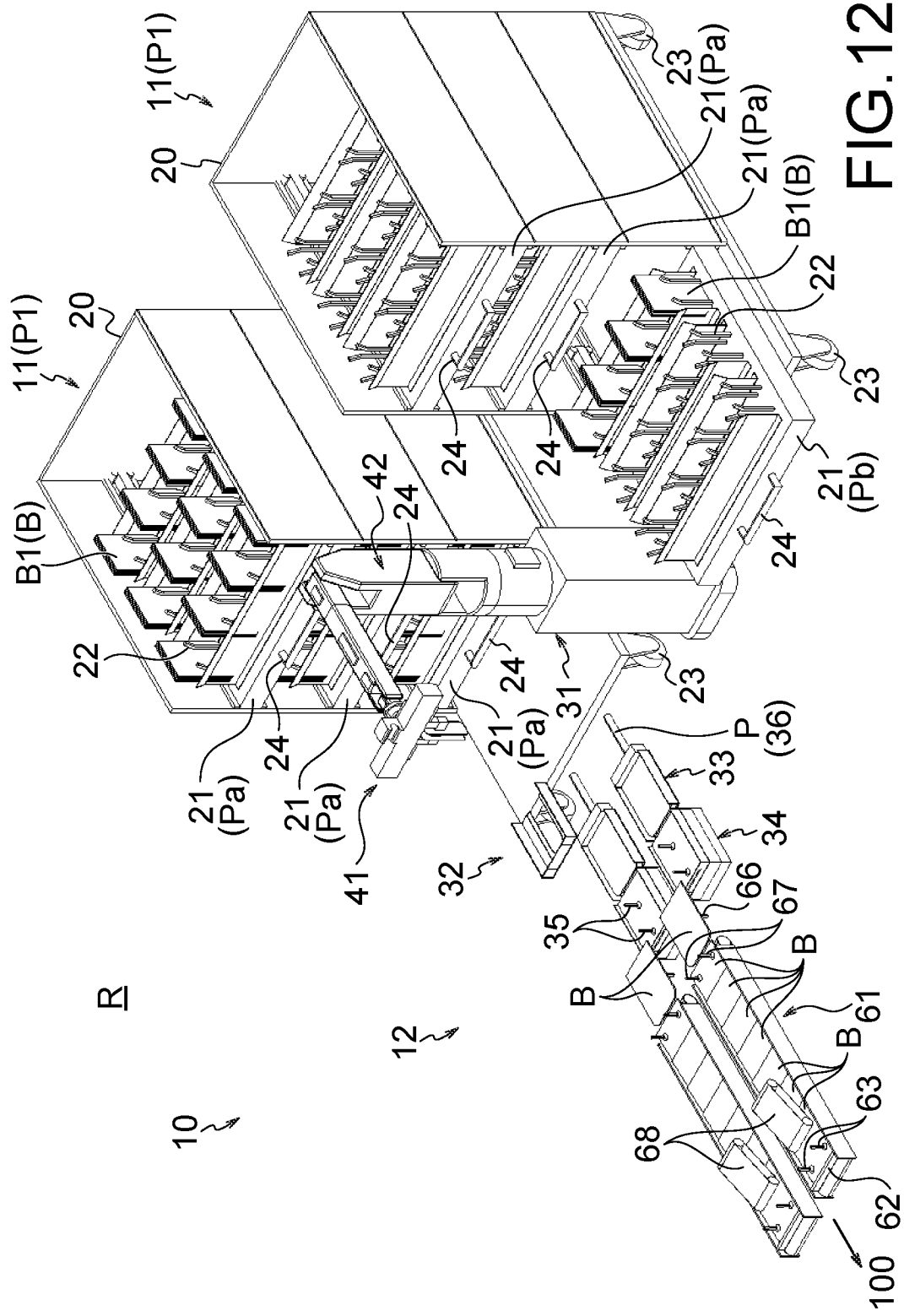
FIG. 12 is a view illustrating a bag supply system according to a third application example.

FIG. 12 is a view illustrating a bag supply system 10 according to a third application example.

A bag supply device 12 of the present application example includes a temporary holding unit 66, a bag conveying unit 61, a bag lifting unit 67, a feeding unit 68, a conveyance stopper 62, and a second bag pickup unit 63, but is not provided with a delivery unit 37.

A bag B is delivered from a first bag pickup unit 35 to the temporary holding unit 66, and the temporary holding unit 66 supports the bag B. The illustrated temporary holding unit 66 includes a sucker that sucks and holds the bag B, and fixedly supports the bag B. Incidentally, the temporary holding unit 66 may support the bag B while fixing a position of the bag B by applying a fixing force to the bag B, or the bag B may be just placed without application of the fixing force. The temporary holding unit 66 is provided to be movable in the horizontal direction, and reciprocates between a receiving position where the bag B is received from the first bag pickup unit 35 at a position that does not interfere with a magazine 34, and a position where the bag B is delivered to the bag conveying unit 61 at a position that does not interfere with the bag B on the bag conveying unit 61.

The bag conveying unit 61 includes an endless conveyor belt that continuously runs, and conveys the bag B fed via the temporary holding unit 66 toward the downstream side. The bag conveying unit 61 of the present application example conveys a plurality of the bags B in the state of overlapping each other toward the downstream side, and basically, a bag B on the downstream side is arranged at an upper overlapping position than a bag B on the upstream side.

When the temporary holding unit 66 supplies a new bag B to the bag conveying unit 61, the bag lifting unit 67 lifts a rear position (that is, an upstream position) of a bag B at the rearmost side (that is, the most upstream side) on the bag conveying unit 61. As a result, the new bag B supplied from the temporary holding unit 66 is inserted into a lower side of the bag B lifted by the bag lifting unit 67, and is arranged at the rearmost side on the bag conveying unit 61. Incidentally, the bag B delivered from the temporary holding unit 66 to the bag conveying unit 61 is conveyed to the downstream side along with running of the conveyor belt of the bag conveying unit 61, and a rear portion (that is, an upstream portion) thereof is arranged immediately below the bag lifting unit 67.

The conveyance stopper 62 regulates a position of a bag B at the head (that is, the most downstream side) among the plurality of bags B conveyed by the bag conveying unit 61. Incidentally, the bag B arranged on the uppermost side among the plurality of bags B arranged to be superimposed on each other on the bag conveying unit 61 is normally a leading bag B, but there is a case where another bag B is arranged on the downstream side than the bag B arranged on the uppermost side along with the running of the conveyor belt of the bag conveying unit 61. Even in such a case, the feeding unit 68 delivers the bag B, which is arranged on the uppermost side, to the downstream side to abut on the conveyance stopper 62.

The feeding unit 68 is arranged above the bag conveying unit 61 at a position to abut on the bag B arranged on the uppermost side on the bag conveying unit 61. The illustrated feeding unit 68 includes an endless conveyor belt. The bag B arranged on the uppermost side on the bag conveying unit 61 is sandwiched between the conveyor belt of the bag conveying unit 61 and the conveyor belt of the feeding unit 68, and the bag B arranged on the uppermost side is delivered toward the downstream side by the conveyor belt of the feeding unit 68 to abut on the conveyance stopper 62. Therefore, it is preferable that the conveyor belt of the feeding unit 68 be formed of a member capable of applying a large frictional force to the bag B. As the feeding unit 68 is provided in this manner, it is possible to surely deliver the bag B arranged on the uppermost side on the bag conveying unit 61 to the position of the conveyance stopper 62.

Then, the bag B arranged on the uppermost side on the bag conveying unit 61 is taken out by the second bag pickup unit 63 at a position fixed by the conveyance stopper 62 to be supplied to the bag processing device 100 at the subsequent stage.

Incidentally, two sets of a depositing unit 33, a bag transporting unit 36 (pusher P), the magazine 34, the first bag pickup unit 35, the temporary holding unit 66, the bag lifting unit 67, the bag conveying unit 61, the feeding unit 68, the conveyance stopper 62, and the second bag pickup unit 63 are provided in the present application example.

[Modifications]

The present invention is not limited to the above-described embodiment and modifications. For example, various modifications may be made to the respective elements of the embodiment and the modifications described above.

[First Modification]

Figure 13:
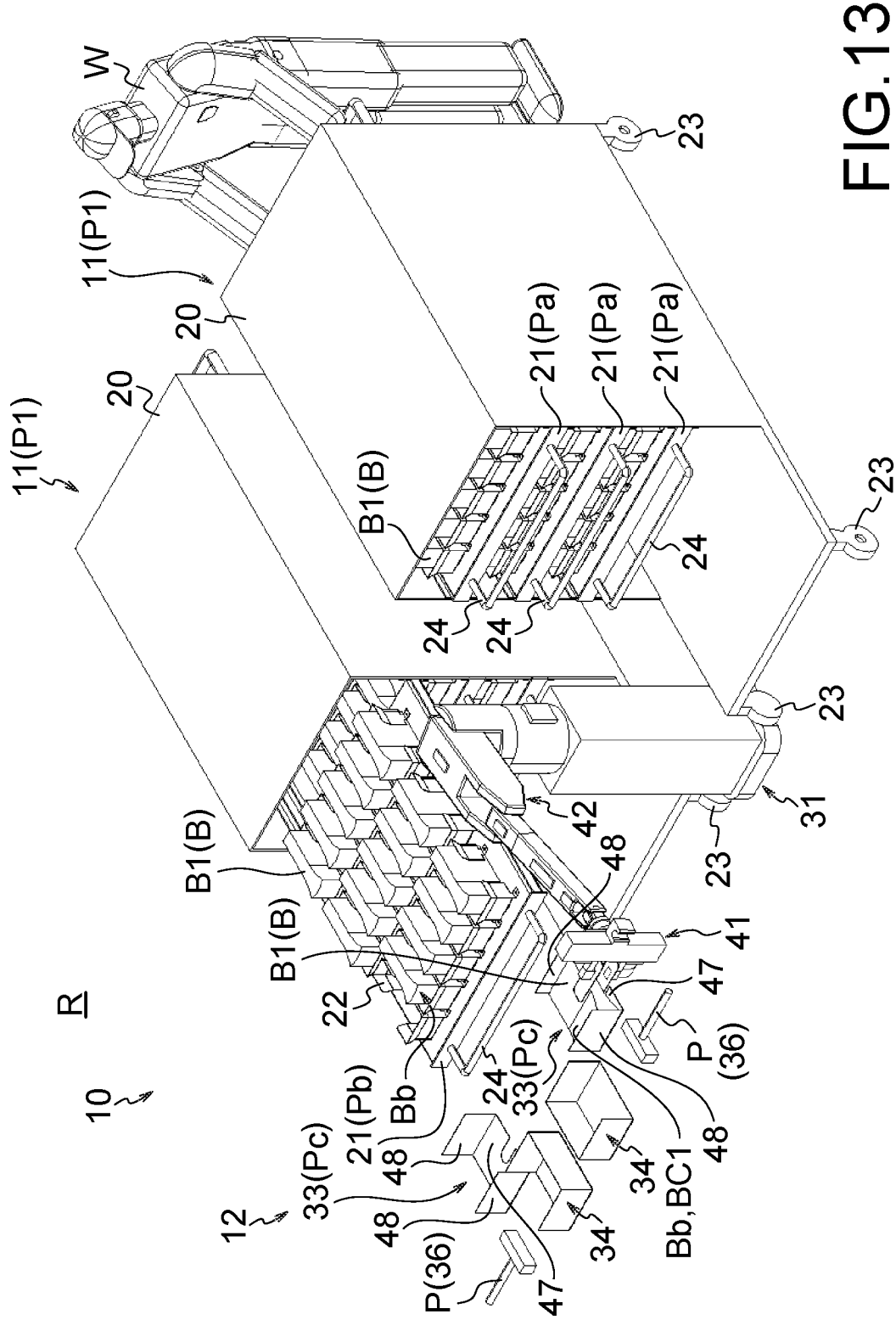
FIG. 13 is a view relating to a first modification for describing a step of supplying a plurality of bags from a bag stocker to a bag supply device.
Figure 14:
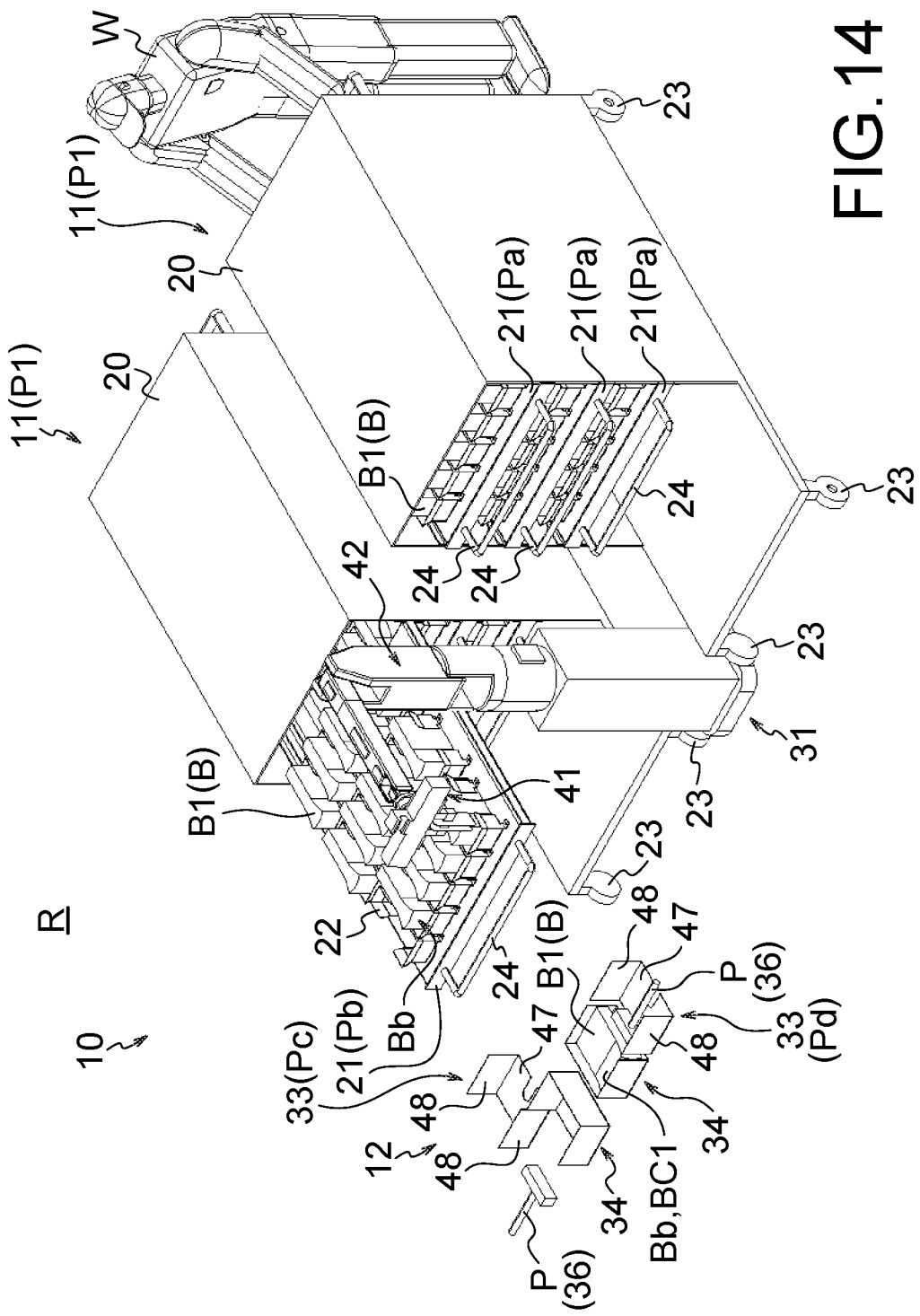
FIG. 14 is a view relating to the first modification for describing the step of supplying the plurality of bags from the bag stocker to the bag supply device.

FIGS. 13 and 14 are views relating to a first modification for describing a step of supplying a plurality of bags B from a bag stocker 11 to a bag supply device 12. In the present modification, the same or similar elements as those of the bag supply system 10 according to the above-described embodiment will be denoted by the same reference signs, and the detailed description thereof will be omitted.

Even in the present modification, each of bag bundles B1 is supported by each of holding members 22 in an upright state in each of bag accommodating units 21 of the bag stocker 11. However, each of the holding members 22 supports the corresponding bag bundle B1 such that mouth portions Bb of two or more bags B included in the corresponding bag bundle B1 are directed in the horizontal direction. That is, the bag bundle B1 is supported by the corresponding holding member 22 such that a pair of short edges including an edge Bc1 where the mouth portion Bb is formed is directed in the horizontal direction and extends in the vertical direction and that a pair of long edges where the mouth portion Bb is not formed is directed in the vertical direction and extends in the horizontal direction.

Each of the holding members 22 of the present modification has a box-like shape divided at an intermediate portion. That is, each of the holding members 22 has a pair of end portion holding portions. Each end portion holding portion has a shape corresponding to a shape of an end portion of the bag bundle B1 and surrounds the end portion of the bag bundle B1 from three sides. As a result, both the end portions of each of the bag bundles B1 are supported by the pair of end portion holding portions of each of the holding members 22, and each of the bag bundles B1 is held in an upright state.

The bag supply device 12 of the present modification includes no arrangement adjustment unit 32, and the bag bundle B1 is directly carried from the bag stocker 11 (that is, the bag accommodating unit 21 arranged at a withdrawing position Pb) to a depositing unit 33.

The depositing unit 33 is provided to be movable in the horizontal direction, and is provided to be arrangeable at a supply position Pc at which the bag bundle B1 is delivered from a taking-out unit 31 (that is, a bag holding unit 41), and a discharge position Pd at which the bag bundle B1 is delivered to the magazine 34. The supply position Pc is a position where the taking-out unit 31 (particularly the bag holding unit 41) and a bag transporting unit 36 (for example, a pusher P) do not interfere with each other when the bag bundle B1 is delivered from the taking-out unit 31 to the depositing unit 33. The taking-out unit 31 can carry the bag bundle B1 smoothly to the depositing unit 33 arranged at the supply position Pc and place the bag bundle B1 at an appropriate position on a transport placement portion 47. The discharge position Pd is a position adjacent to the magazine 34, the position where the bag bundle B1 on the transport placement portion 47 is arranged on a movement path of the pusher P. The pusher P can push the bag bundle B1 accommodated in the depositing unit 33 arranged at the discharge position Pd toward the magazine 34 and smoothly accommodate the bag bundle B1 in the magazine 34.

Incidentally, a transport guide portion 48 of the depositing unit 33 guides the bag bundle B1 in contact with the edge Bc1 provided with at least the mouth portion Bb among the plurality of edges of the two or more bags B included in the bag bundle B1 in the present modification. That is, the taking-out unit 31 places the bag bundle B1 on the transport placement portion 47 such that the edge Bc1 provided with the mouth portion Bb of the bag bundle B1 and an edge opposing the edge Bc1 oppose the transport guide portion 48 of the depositing unit 33. Then, the pusher P pushes one edge adjacent to the edge provided with the mouth portion Bb of the bag bundle B1 to accommodate the bag bundle B1 in the magazine 34.

As described above, each of the bag bundles B1 is erected in a state where the mouth portion Bb is directed in the horizontal direction in the bag stocker 11 (that is, the bag accommodating unit 21) in the present modification. Thus, the plurality of bags B included in each of the bag bundles B1 are in the state of being aligned with respect to the width direction due to the influence of gravity at the stage of being accommodated in the bag stocker 11. Thus, even if the arrangement adjustment unit 32 (see FIG. 3 and the like) of the above-described embodiment is not provided, it is possible to arrange the bag bundle B1 in the depositing unit 33 in a state where the plural bags B are aligned with each other in the width direction.

Further, the pusher P pushes the bag bundle B1 in the width direction in the present modification. Therefore, for example, when the pusher P pushes the bag bundle B1 from the depositing unit 33 toward the magazine 34, the bag bundle B1 may be pushed against a side wall portion of the magazine 34. In this case, it is possible to sandwich the bag bundle B1 with the side wall portion of the magazine 34 and the pusher P and align positions in the width direction of the plurality of bags B included in the bag bundle B1 in the magazine 34.

Incidentally, the configuration of the subsequent stages of the magazine 34 is not limited, and may have the same configuration as that of each application example described above, for example.

[Second Modification]

Figure 15:
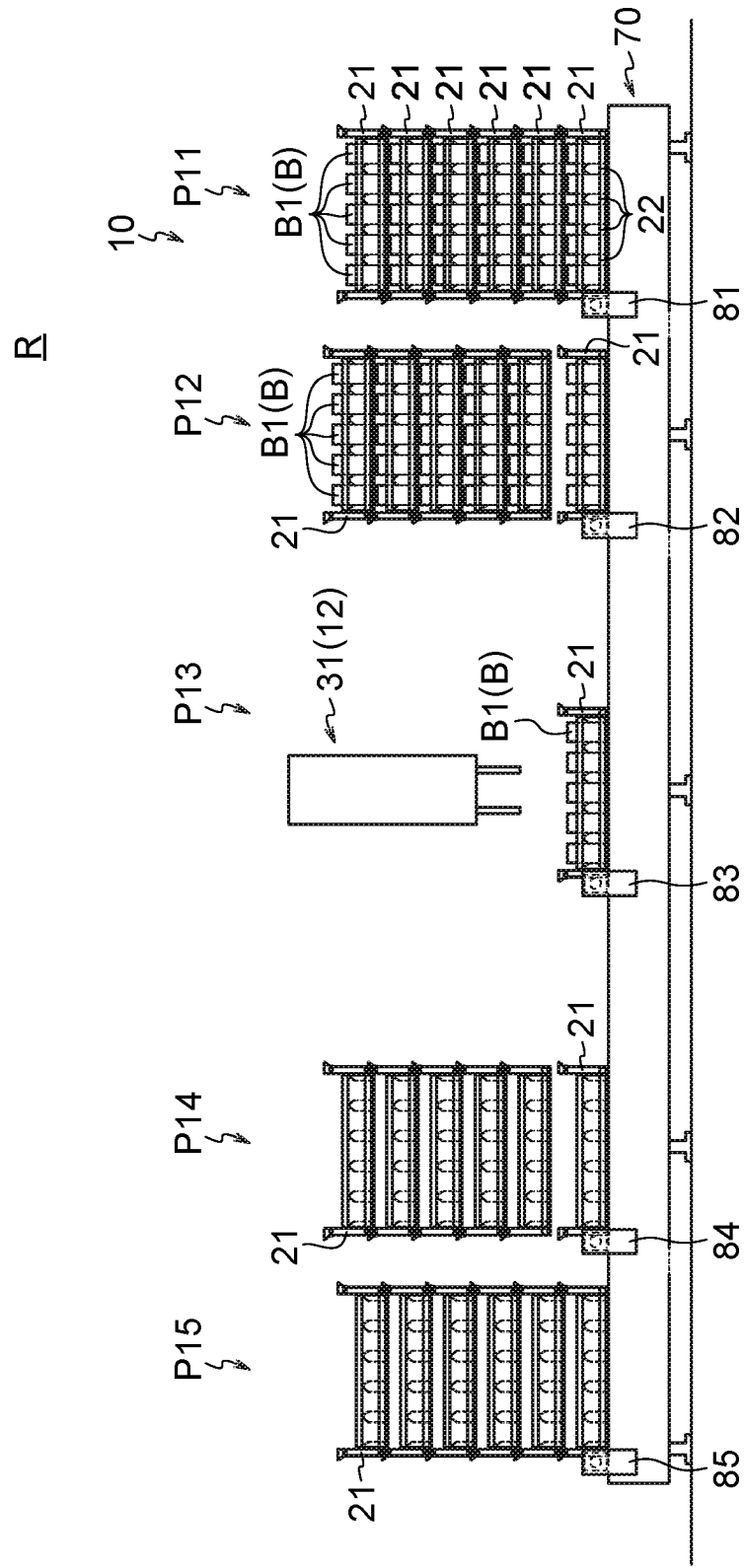
FIG. 15 is a view illustrating a schematic configuration of a bag supply system according to a second modification.

FIG. 15 is a view illustrating a schematic configuration of a bag supply system 10 according to a second modification. A moving unit of the bag supply system 10 of the present modification includes a feeding mechanism 70 installed inside a supply room R.

The feeding mechanism 70 conveys a bag accommodating unit 21 from the upstream side to the downstream side. A specific configuration of the feeding mechanism 70 is not limited, but is typically configured using an endless belt conveyor.

The illustrated feeding mechanism 70 sequentially and intermittently conveys the bag accommodating unit 21 to a bag replenishment position P11, a first standby position P12, a bag bundle supply position P13, a second standby position P14, and a discharge position P15 in cooperation with a first stopper 81 to a fifth stopper 85. For example, the feeding mechanism 70 conveys the bag accommodating unit 21 from the bag replenishment position P11 to the bag bundle supply position P13.

The bag replenishment position P11 is a position where the bag accommodating unit 21 in a state where a bag bundle B1 is supported by a holding member 22 is replenished to the feeding mechanism 70. In the illustrated bag supply system 10, a plurality of bag accommodating units 21 are replenished to the feeding mechanism 70 in the state of being stacked on each other at the bag replenishment position P11. As a result, a large amount of the bags B can be stocked at the bag replenishment position P11.

Incidentally, a method of replenishing the bag accommodating unit 21 at the bag replenishment position P11 is not limited. For example, a worker (not illustrated) may replenish the bag bundle B1 (a plurality of bags B) with respect to each of the bag accommodating units 21 at the bag replenishment position P11. Alternatively, the bag bundle B1 (the plurality of bags B) may be replenished to each of the bag accommodating units 21 outside the supply room R, and then, the bag accommodating unit 21 replenished with the bag bundle B1 (bags B) may be carried from the outside of the supply room R to the inside and replenished to the feeding mechanism 70. In this case, the plurality of bag accommodating units 21 may be carried from the outside to the inside of the supply room Rat once by using a bag stocker (see a reference sign "11" in FIG. 2 and the like). Further, the plurality of bag accommodating units 21 may be stacked on the bag stocker in the state of being stacked on each other, and these bag accommodating units 21 may be replenished to the feeding mechanism 70 at once while maintaining the state of being stacked on each other at the bag replenishment position P11.

The first standby position P12 is a position where the plurality of bag accommodating units 21 carried from the bag replenishment position P11 by the feeding mechanism 70 are caused to stand by. The bag accommodating units 21 arranged at the first standby position P12 are fed to the bag bundle supply position P13 one by one. Specifically, the other bag accommodating unit 21 arranged at the first standby position P12 is lifted by a first lifting device (not illustrated) from the bag accommodating unit 21 at the lowest position at the first standby position P12. Then, the bag accommodating unit 21 at the lowest position at the first standby position P12 is conveyed to the bag bundle supply position P13 by the feeding mechanism 70 while the other bag accommodating unit 21 is being lifted and separated.

The bag bundle supply position P13 is a position where the plurality of bags B (the bag bundle B1) are supplied from the bag accommodating unit 21 to the bag supply device 12. A mode of supplying the bags B (bag bundle B1) to the bag supply device 12 at the bag bundle supply position P13 may be the same mode as the above-described embodiment (including the above-described application examples).

The second standby position P14 is a position where the empty bag accommodating unit 21 (that is, the bag accommodating unit 21 not accommodating the bags B (bag bundle B1)) carried from the bag bundle supply position P13 by the feeding mechanism 70 is caused to stand by. The bag accommodating units 21 are fed one by one from the bag bundle supply position P13 to the second standby position P14. Specifically, all the bag accommodating units 21 arranged at the second standby position P14 are lifted by a second lifting device (not illustrated), the feeding mechanism 70 conveys the empty bag accommodating unit 21 from the bag bundle supply position P13 to the second standby position P14 in this state, and the second lifting device places the bag accommodating unit 21 that has been lifted above the empty bag accommodating unit 21 newly arranged at the second standby position P14.

The discharge position P15 is a position configured to discharge the empty bag accommodating unit 21 from the feeding mechanism 70 and at which a plurality of stacked empty bag accommodating units 21 are conveyed from the second standby position P14 to the discharge position P15. A method of discharging the plurality of empty bag accommodating units 21 at the discharge position P15 is not limited, and the discharge may be performed by a machine (not illustrated), or the discharge may be performed by a worker (not illustrated).

In this manner, the feeding mechanism 70 conveys the bag accommodating units 21 from the bag replenishment position P11 where the bag accommodating unit 21 in the state where the bag bundle B1 is supported by the holding member 22 is replenished toward the bag bundle supply position P13, and conveys the bag accommodating units 21 one by one to the bag bundle supply position P13. Then, the plurality of bags B are supplied from the bag accommodating unit 21 to the bag supply device 12 at the bag bundle supply position P13. Therefore, the bag supply method according to the present modification includes the step of causing the feeding mechanism 70 to convey the bag accommodating unit 21 from the bag replenishment position P11 toward the bag bundle supply position P13 between the step of replenishing the plurality of bags B to the bag accommodating unit 21 and the step of supplying the plurality of bags B from the bag accommodating unit 21 to the bag supply device 12.

Incidentally, the feeding mechanism 70 may install separate feeding units, which can be driven independently from each other, at the bag replenishment position P11, the first standby position P12, the bag bundle supply position P13, the second standby position P14, and the discharge position P15, respectively, or may install a common feeding unit regarding two or more positions or all the positions of the bag replenishment position P11, the first standby position P12, the hag bundle supply position P13, the second standby position P14, and the discharge position P15. It is possible to make conveying modes of the hag accommodating unit 21 different for each position by installing the separate feeding units. On the other hand, it is possible to reduce the number of feeding units and simplify the configuration of the feeding mechanism 70 by installing the common feeding unit.

Further, the illustrated bag supply system 10 is provided with the first stopper 81 to the fifth stopper 85 that can block the conveyance of the bag accommodating unit 21 by the feeding mechanism 70. The first stopper 81 to the fifth stopper 85 are provided at the bag replenishment position P11 to the discharge position P15, respectively, and can be arranged at a conveyance blocking position to prevent one or a plurality of bag accommodating units 21 arranged at corresponding positions from being conveyed to the downstream side by the feeding mechanism 70, and a conveyance permitting position to permit one or a plurality of bag accommodating units 21 arranged at corresponding positions to be conveyed to the downstream side by the feeding mechanism 70.

An arrangement mode of the first stopper 81 to the fifth stopper 85 is not limited, but typically, the first stopper 81 to the fifth stopper 85 arranged at the conveyance blocking positions contact the bag accommodating units 21 (particularly, the bag accommodating units 21 directly contacting the feeding mechanism 70) at the corresponding positions on the downstream side. Incidentally, the first stopper 81 to the fifth stopper 85 of the present modification also have a function of positioning the bag accommodating units 21 at the corresponding positions. That is, it is possible to accurately arrange the bag accommodating units 21 at the contact positions with the first stopper 81 to the fifth stopper 85 by bringing the bag accommodating units 21 conveyed by the feeding mechanism 70 into contact with the first stopper 81 to the fifth stopper 85 arranged at the conveyance blocking positions to be stopped.

Further, specific configurations of the first stopper 81 to the fifth stopper 85 are not limited. Each of the illustrated first stopper 81 to fifth stopper 85 includes an attachment plate fixed to a side portion of the feeding mechanism 70 and an air cylinder fixed to the attachment plate, and a piston rod of the air cylinder forms a stopper portion that contacts the bag accommodating unit 21 on the feeding mechanism 70. It is possible to arrange the piston rod at the conveyance blocking position by driving this air cylinder to make the piston rod protrude, and further, it is possible to arrange the piston rod at the conveyance permitting position by driving the air cylinder to make the piston rod retract. Incidentally, an elastic member or a plate (block) may be attached to a place of the piston rod which is in contact with the bag accommodating unit 21 (particularly a side surface) in the state where being arranged at the conveyance blocking position.

Incidentally, the feeding mechanism 70 and the first stopper 81 to the fifth stopper 85 are controlled by a control unit (not illustrated). That is, the control unit controls transport and stop timings of the bag accommodating unit 21 using the feeding mechanism 70 and a timing of arranging each of the first stopper 81 to the fifth stopper 85 at the conveyance blocking position or the conveyance permitting position so that the bag accommodating unit 21 can be conveyed to the bag replenishment position P11 to the discharge position P15 at an appropriate timing. Incidentally, FIG. 15 illustrates the first stopper 81 to the fifth stopper 85 arranged at the conveyance blocking positions. The illustrated first stopper 81 to fifth stopper 85 (particularly piston rods) move forward and backward in a direction perpendicular to the paper plane (that is, in a direction perpendicular to a conveying direction of the bag accommodating unit 21 by the feeding mechanism 70) under the control of the control unit, and the conveyance blocking position exists on a path of the bag accommodating unit 21 on the feeding mechanism 70 and the conveyance permitting position exists at a position out of the path.

When the bag accommodating unit 21 is not conveyed from the bag replenishment position P11 by the feeding mechanism 70 (for example, while the bag accommodating unit 21 is being replenished to the feeding mechanism 70 at the bag supplying position P11), the first stopper 81 is arranged at the conveyance blocking position. On the other hand, when the bag accommodating unit 21 is conveyed from the bag replenishment position P11 to the first standby position P12 by the feeding mechanism 70, the first stopper 81 is arranged at the conveyance permitting position. Further, when the bag accommodating unit 21 is not conveyed from the first standby position P12 by the feeding mechanism 70 (for example, while the bag supply device 12 is taking the bag bundle 31 (bags B) out of the bag accommodating unit 21 at the bag bundle supply position P13 or when the bag accommodating unit 21 is conveyed from the bag replenishment position P11 to the first standby position P12), the second stopper 82 is arranged at the conveyance blocking position. On the other hand, when the bag accommodating unit 21 is conveyed from the first standby position P12 to the bag bundle supply position P13 by the feeding mechanism 70, the second stopper 82 is arranged at the conveyance permitting position. Further, when the bag accommodating unit 21 is not conveyed from the bag bundle supply position P13 by the feeding mechanism 70 (for example, while the bag supply device 12 is taking the bag bundle 31 (bags B) out of the bag accommodating unit 21 at the bag bundle supply position P13 or when the bag accommodating unit 21 is conveyed from the first standby position P12 to the bag bundle supply position P13), the third stopper 83 is arranged at the conveyance blocking position. On the other hand, when the bag accommodating unit 21 is conveyed from the bag bundle supply position P13 to the second standby position P1.4 by the feeding mechanism 70, the third stopper 83 is arranged at the conveyance permitting position.

Further, when the bag accommodating unit 21 is not conveyed from the second standby position P14 by the feeding mechanism 70 (for example, when the bag accommodating unit 21 is conveyed from the bag bundle supply position P13 to the second standby position P14), the fourth stopper 84 is arranged at the conveyance blocking position. On the other hand, when the bag accommodating unit 21 is conveyed from the second standby position P14 to the discharge position P15 by the feeding mechanism 70, the fourth stopper 84 is arranged at the conveyance permitting position. Further, when the bag accommodating unit 21 is not conveyed from the discharge position P15 by the feeding mechanism 70 (for example, when the bag accommodating unit 21 is conveyed from the second standby position P14 to the discharge position P15), the fifth stopper 85 is arranged at the conveyance blocking position. On the other hand, when the bag accommodating unit 21 is conveyed from the discharge position P15 by the feeding mechanism 70, the fifth stopper 85 is arranged at the conveyance permitting position.

Incidentally, the driving of the feeding mechanism 70 and the first stopper 81 to the fifth stopper 85 may be controlled based on a detection result of a sensor (not illustrated) or the like, or may be controlled based on an instruction from the worker or the like. For example, when it is determined that the bag accommodating unit 21 does not exist at the first standby position P12 based on the detection result of the sensor that detects the presence or absence of the bag accommodating unit 21 at the first standby position P12, the bag accommodating unit 21 may be conveyed from the bag replenishment position P11 to the first standby position P12. Further, when it is determined that the bag accommodating units 21 arranged at the second standby position P14 have reached a predetermined number based on the detection result of the sensor detecting whether the bag accommodating units 21 at the second standby position P14 have reached the predetermined number, the bag accommodating unit 21 may be conveyed from the second standby position P14 to the discharge position P15.

Incidentally, the bag replenishment position P11 to the discharge position P15 may be separated from each other by a support or a partition. For example, it is possible to restrict the entry of a human such as the worker and improve the safety by enclosing a place other than the path of the bag accommodating unit 21 conveyed by the feeding mechanism 70 by the support or the partition.

[Third Modification]

Figure 16:
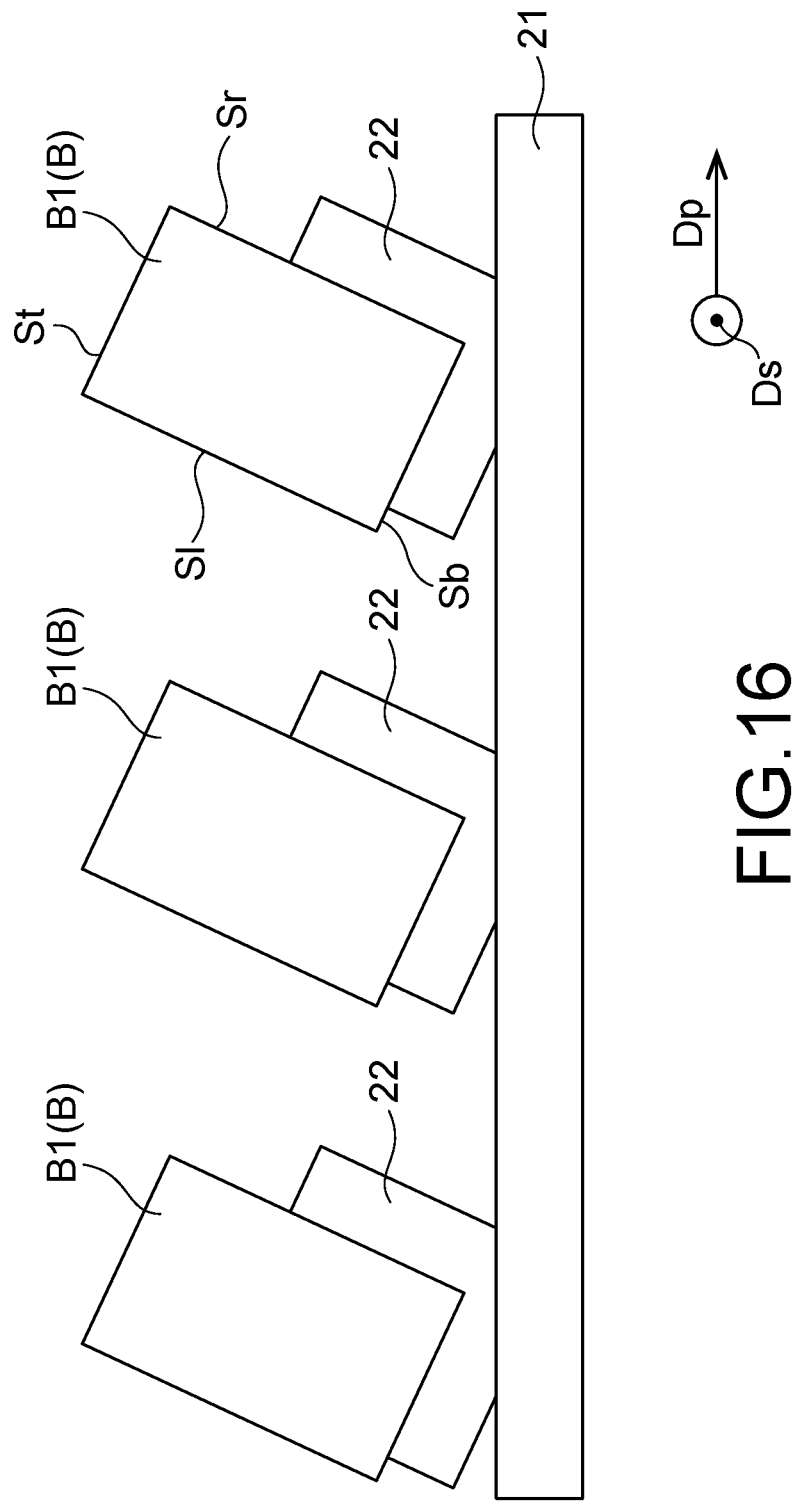
FIG. 16 is a schematic view illustrating a bag accommodating unit and a holding member according to a third modification.

FIG. 16 is a schematic view illustrating a bag accommodating unit 21 and a holding member 22 according to a third modification. The bag accommodating unit 21 and the holding member 22 illustrated in FIG. 16 have been simplified in order to facilitate understanding. Therefore, for example, FIG. 16 does not illustrate a holding portion for movement 24. Further, the number and the holding members 22 provided on the bag accommodating unit 21 and a specific shape thereof are not limited to the numbers and shapes illustrated in FIG. 16.

In FIG. 16, a reference sign "Ds" indicates a sliding direction of the bag accommodating unit 21 in the horizontal direction, and particularly indicates the direction from the accommodating position Pa to the withdrawing position Pb in the bag stocker 11. Further, the reference sign "Dp" indicates a direction perpendicular to the reference sign "Ds" in the horizontal direction and indicates the width direction of each of the bag accommodating units 21.

In the present modification, each of the holding members 22 has a substantially L-shaped cross section, and a bag bundle B1 is placed on the holding member 22. Each of the holding members 22 contacts at least a part of two sides, adjacent to each other, among sides of each of two or more bags B included in the corresponding bag bundle B1.

The holding member 22 illustrated in FIG. 16 supports the bag bundle B1 in a state where the plurality of bags B constituting the bag bundle B1 overlap each other in the sliding direction (refer to "Ds") of the bag accommodating unit 21. Further, the holding member 22 illustrated in FIG. 16 supports the bag bundle B1 in the state of contacting a bottom side Sb and a right side Sr, adjacent to each other in the vertical direction, among a top side St, a bottom side Sb, a left side Sl and the right side Sr of the bag bundle B1 (that is, each of the bags B). Further, the holding member 22 illustrated in FIG. 16 supports the bag bundle B1 in a state where the bottom side Sb of the bag bundle B1 (that is, each of the bags B) is inclined with respect to the horizontal direction (particularly, the direction indicated by the reference sign "Dp"). Accordingly, the holding member 22 contacts a range including a place near a corner formed by one of the left side Sl and the right side Sr (the right side Sr in FIG. 16) and the bottom side Sb of the bag bundle B1.

According to the present modification, it is possible to completely expose both the place adjacent to the top side St and the place adjacent to the left side Sl of each of the bag bundles B1 in the state where each of the bag bundles B1 is supported by the holding member 22. Therefore, a taking-out unit 31 (see FIG. 3 and the like) can hold not only the place adjacent to the top side St of each of the bag bundles B1 but also the place adjacent to the left side Sl, and it is possible to increase the degree of freedom of the mode of taking out the bag bundle B1.

Further, the bag bundle B1 (that is, the respective bags B) is placed so as to be slidable along a supporting surface of the holding member 22 in the state of being placed on the corresponding holding member 22, and thus, is arranged in the state of being accurately positioned on the corresponding holding member 22 under the influence of gravity. In particular, when the supporting surface of the holding member 22 is inclined with respect to the vertical direction or the supporting surface of the holding member 22 has a planar shape, it is possible to effectively promote such sliding movement of the bag bundle B1 caused by the influence of gravity. Incidentally, the supporting surface of the holding member 22 preferably has a shape corresponding to a shape of the side of the contact place of the bag bundle B1 (that is, the respective bags B), and is a planar shape in many cases, but does not necessarily coincide with the shape of the side of the contact place of the bag bundle B1.

Incidentally, the plurality of bags B constituting the bag bundle B1 are stacked in the sliding direction (see "Ds") of the bag accommodating unit 21 in FIG. 16, but the plurality of bags B constituting the bag bundle B1 may be stacked in other directions, and for example, may be stacked in the direction indicated by the reference sign "Dp" or in the other horizontal direction. Further, the direction (that is, the normal direction) of the front surface and the back surface of each of the plurality of bags B constituting the bag bundle B1 is directed substantially in the horizontal direction in FIG. 16, but these front and back surfaces may be directed in other directions. For example, the direction of the front surface and the back surface of each of the plurality of bags B constituting the bag bundle B1 may be a direction other than the horizontal direction (direction other than the direction parallel to the vertical direction).

[Fourth Modification]

Figure 17:
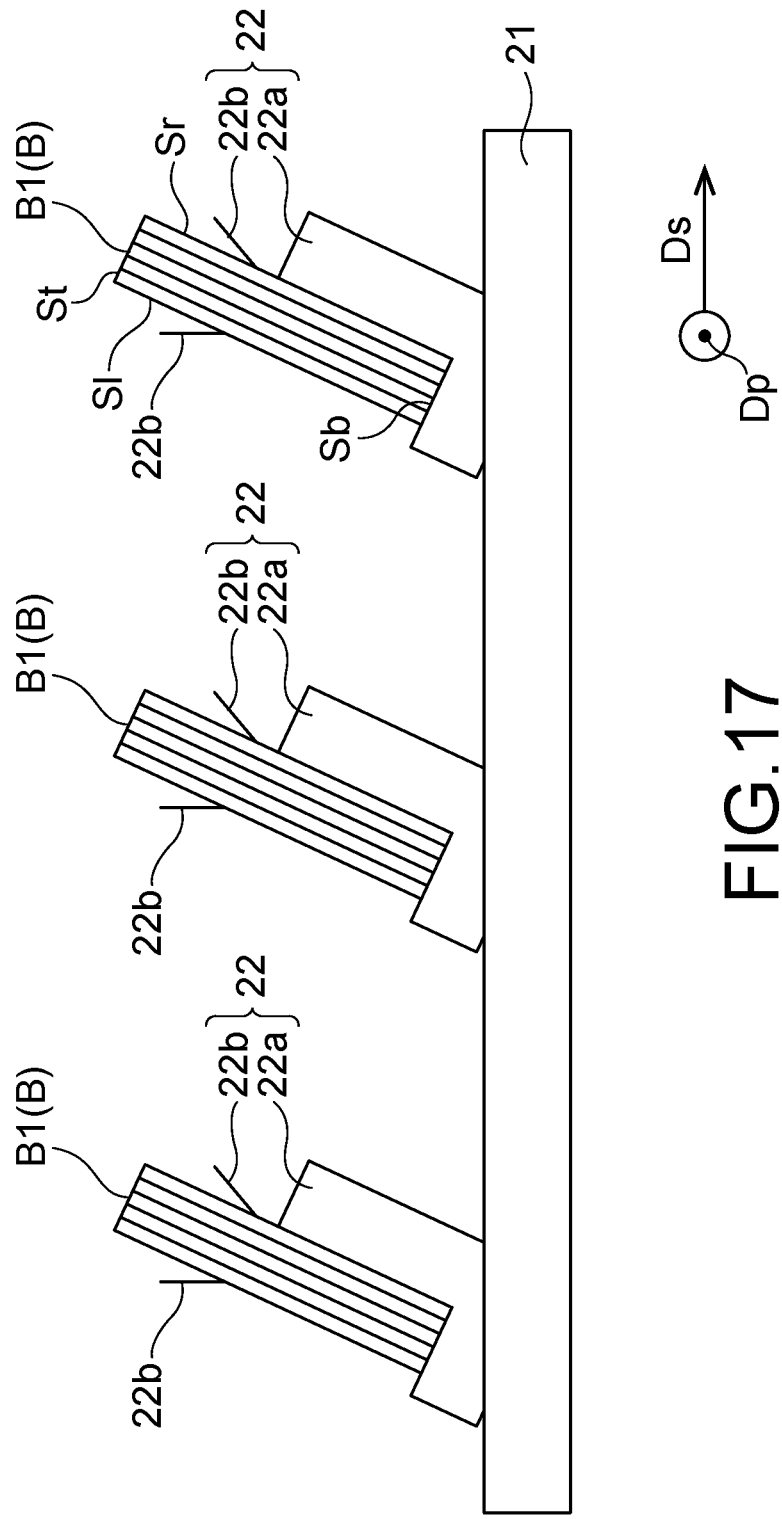
FIG. 17 is a schematic view illustrating a bag accommodating unit and a holding member according to a fourth modification.

FIG. 17 is a schematic view illustrating a bag accommodating unit 21 and a holding member 22 according to a fourth modification. FIG. 17 illustrates the bag accommodating unit 21 and the holding member 22 in a simplified manner similarly to FIG. 16, and does not illustrate a holding portion for movement 24, for example. Further, in FIG. 17, a reference sign "Ds" indicates a sliding direction of the bag accommodating unit 21 in the horizontal direction (particularly, a direction from an accommodating position Pa in a bag stocker 11 to a withdrawing position Pb), a reference sign "Dp" indicates a direction (particularly, a width direction of each of the bag accommodating units 21) perpendicular to the reference sign "Ds" of the horizontal direction.

Each of the holding members 22 of the present modification supports a bag bundle B1 so as to contact a front surface or a back surface of at least a bag B arranged downward in the vertical direction between a bag B arranged at the frontmost side and a bag B arranged on the backmost side among the two or more bags B included in the bag bundle B1. Further, each of the holding members 22 supports the bag bundle B1 such that an upper end portion of the hag bundle B1 with respect to the direction parallel to the vertical direction is arranged at a position apart from a lower end portion with respect to the direction Ds from the accommodating position Pa of the bag accommodating unit 21 toward the withdrawing position Pb.

Each of the holding members 22 illustrated in FIG. 17 supports the bag bundle 51 so as to contact both the bag B arranged at the frontmost side and the bag B arranged on the backmost side among the two or more bags B included in the corresponding bag bundle B1.

Each of the holding members 22 has a substantially L-shaped cross section, and a bag bundle B1 is placed on the holding member 22. The holding member 22 illustrated in FIG. 17 supports the bag bundle B1 in a state where the plurality of bags B constituting the bag bundle B1 are stacked in a direction perpendicular to the direction indicated by the reference sign "Dp". Further, the holding member 22 illustrated in FIG. 17 supports the bag bundle B1 in the state of contacting a bottom side Sb among sides of the bag bundle B1 (that is, the respective bags B). Incidentally, the holding member 22 illustrated in FIG. 17 includes a first holding member 22a and a second holding member 22b that extends upward in the vertical direction from the first holding member 22a. The first holding member 22a is a base portion fixed on the bag accommodating unit 21, and supports the placed bag bundle B1 from below. The second holding member 22b supports a vertically upper portion of the bag bundle B1 placed on the holding member 22. However, the second holding member 22b does not contact an uppermost portion of the bag bundle B1 placed on the holding member 22 (that is, a range near the top side St) to expose the uppermost portion.

According to the present modification, it is possible to completely expose a place adjacent to the top side St of each of the bag bundles B1 in the state where each of the bag bundles B1 is supported by the holding member 22. Then, the taking-out unit 31 takes the bag bundle B1 out of the bag accommodating unit 21 while holding the exposed part of the bag bundle B1 supported by the holding member 22. Therefore, the taking-out unit 31 can easily and reliably hold the place adjacent to the top side St of each of the bag bundles B1.

Further, the bag bundle B1 (that is, the respective bags B) is placed so as to be slidable along a supporting surface of the holding member 22 in the state of being placed on the corresponding holding member 22, and thus, is arranged in the state of being accurately positioned on the corresponding holding member 22 under the influence of gravity. In particular, when the supporting surface of the holding member 22 is inclined with respect to the vertical direction or the supporting surface of the holding member 22 has a planar shape, it is possible to effectively promote such sliding movement of the bag bundle B1 caused by the influence of gravity. Incidentally, the supporting surface of the holding member 22 preferably has a shape corresponding to a shape of a contact place (the front surface or the back surface in the present modification) of the bag bundle B1 (that is, the respective bags B), and is a planar shape in many cases, but does not necessarily coincide with the shape of the contact place of the bag bundle B1.

Incidentally, each of the bag bundles B1 is arranged to protrude with respect to the direction Ds directed from the accommodating position Pa of the bag accommodating unit 21 toward the withdrawing position Ph on the corresponding holding member 22 in FIG. 17, but may be arranged to protrude in another direction.

[Fifth Modification]

Figure 18:
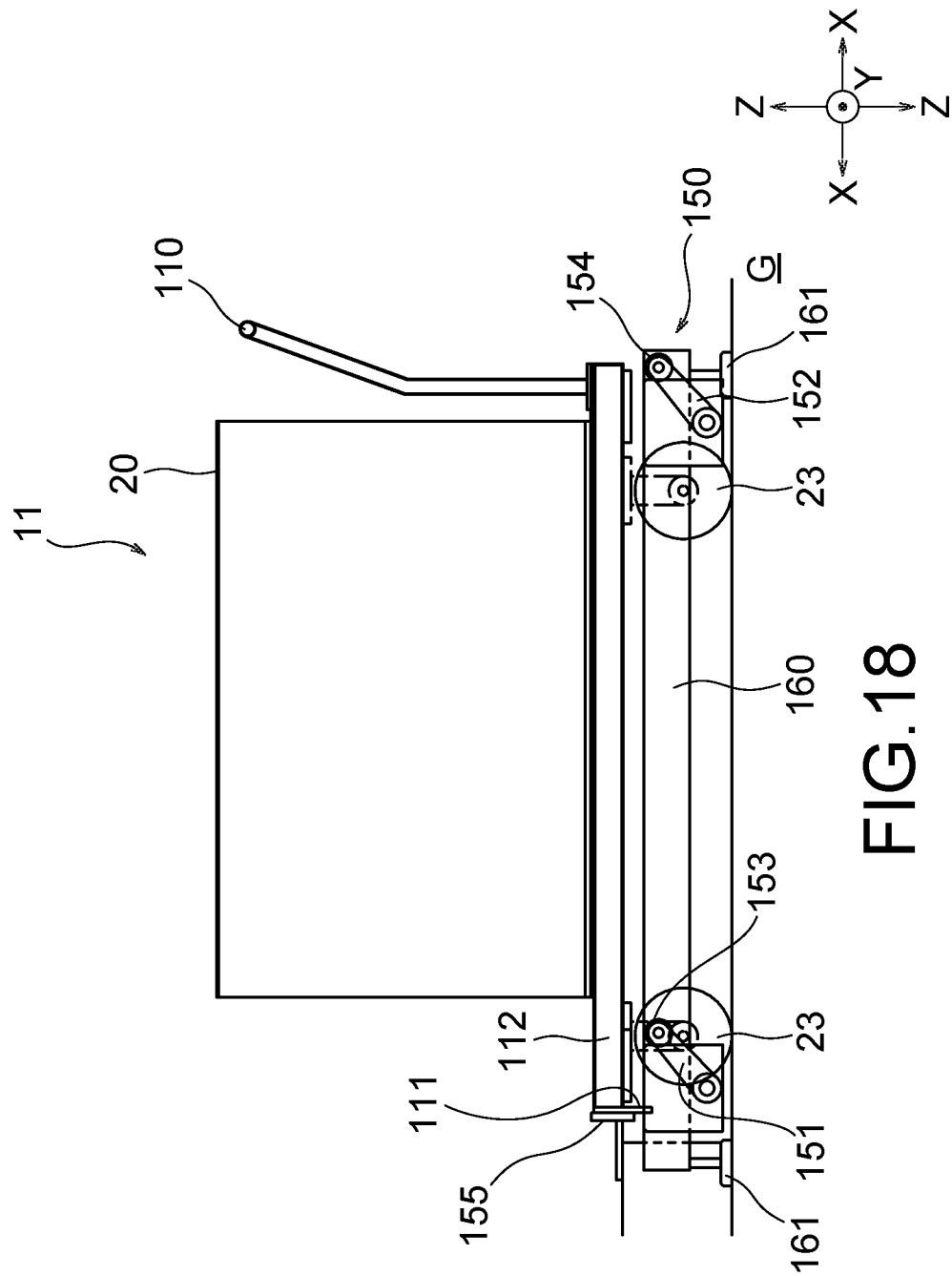
FIG. 18 is a side view illustrating a bag stocker and a wagon lock device according to a fifth modification, which illustrates a non-locked state.
Figure 19:
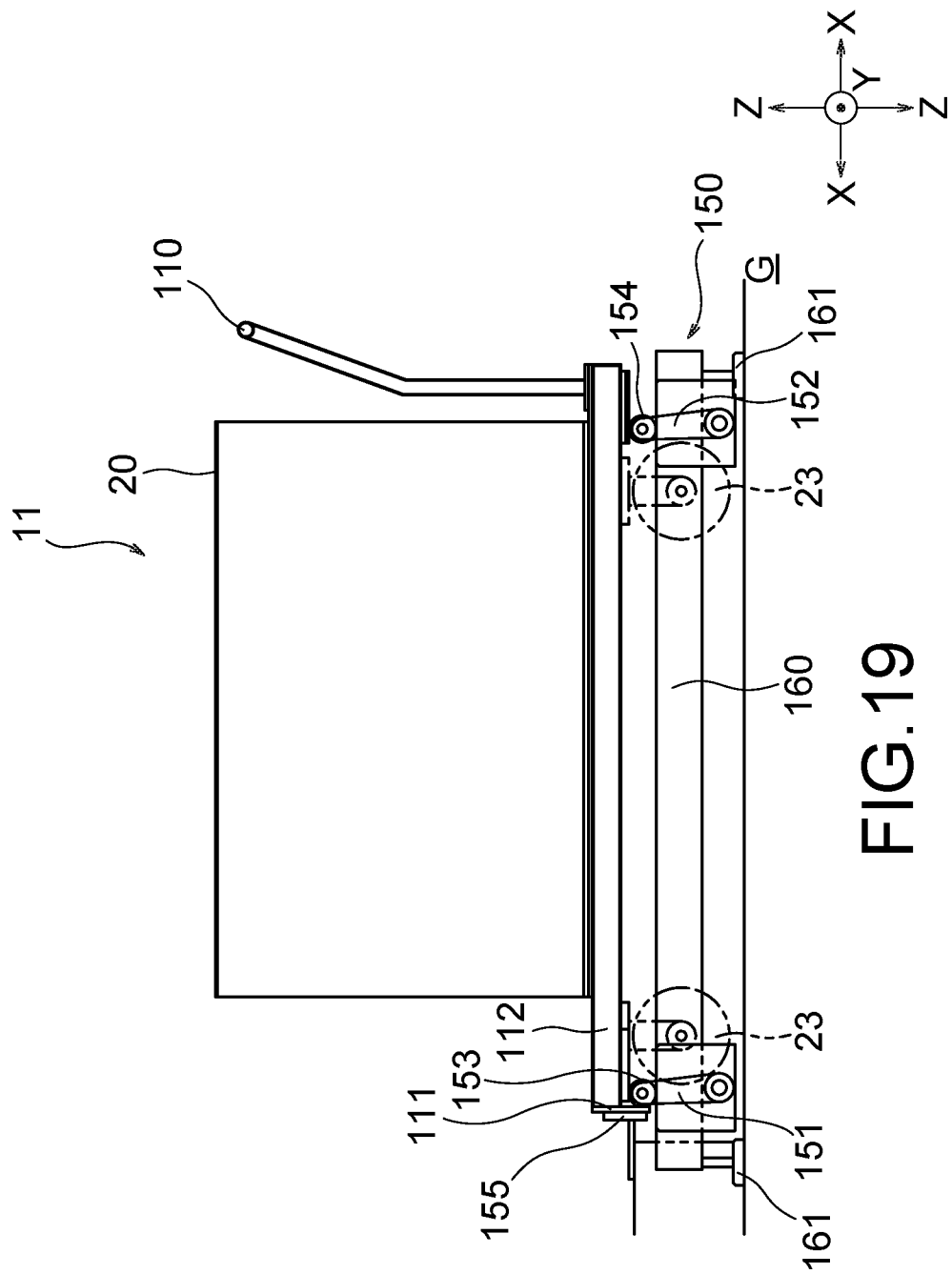
FIG. 19 is a side view illustrating the bag stocker and the wagon lock device according to the fifth modification, which illustrates a locked state.
Figure 20:
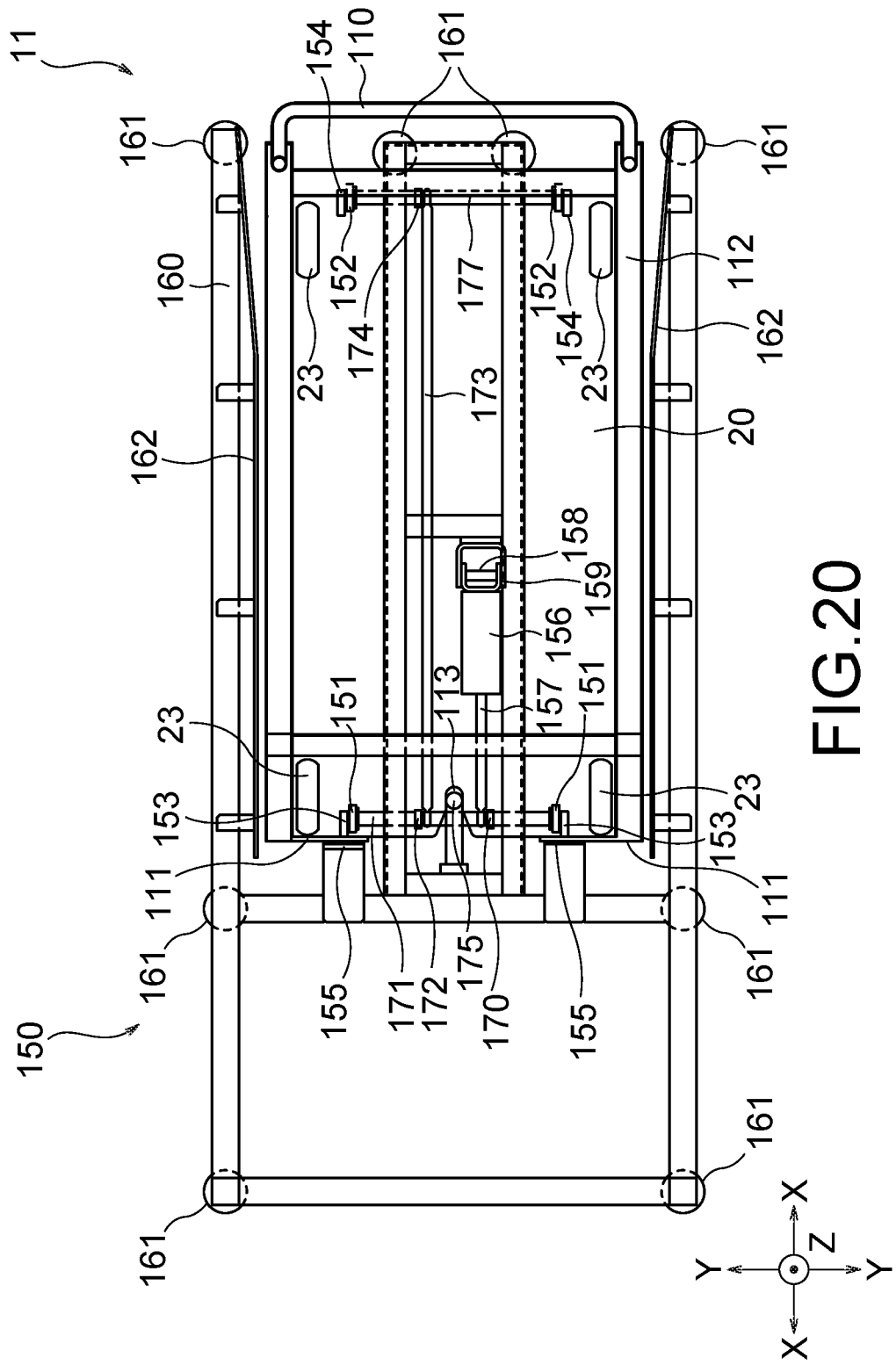
FIG. 20 is a plan view of the bag stocker and the wagon lock device according to the fifth modification, which illustrates the non-locked state.
Figure 21:
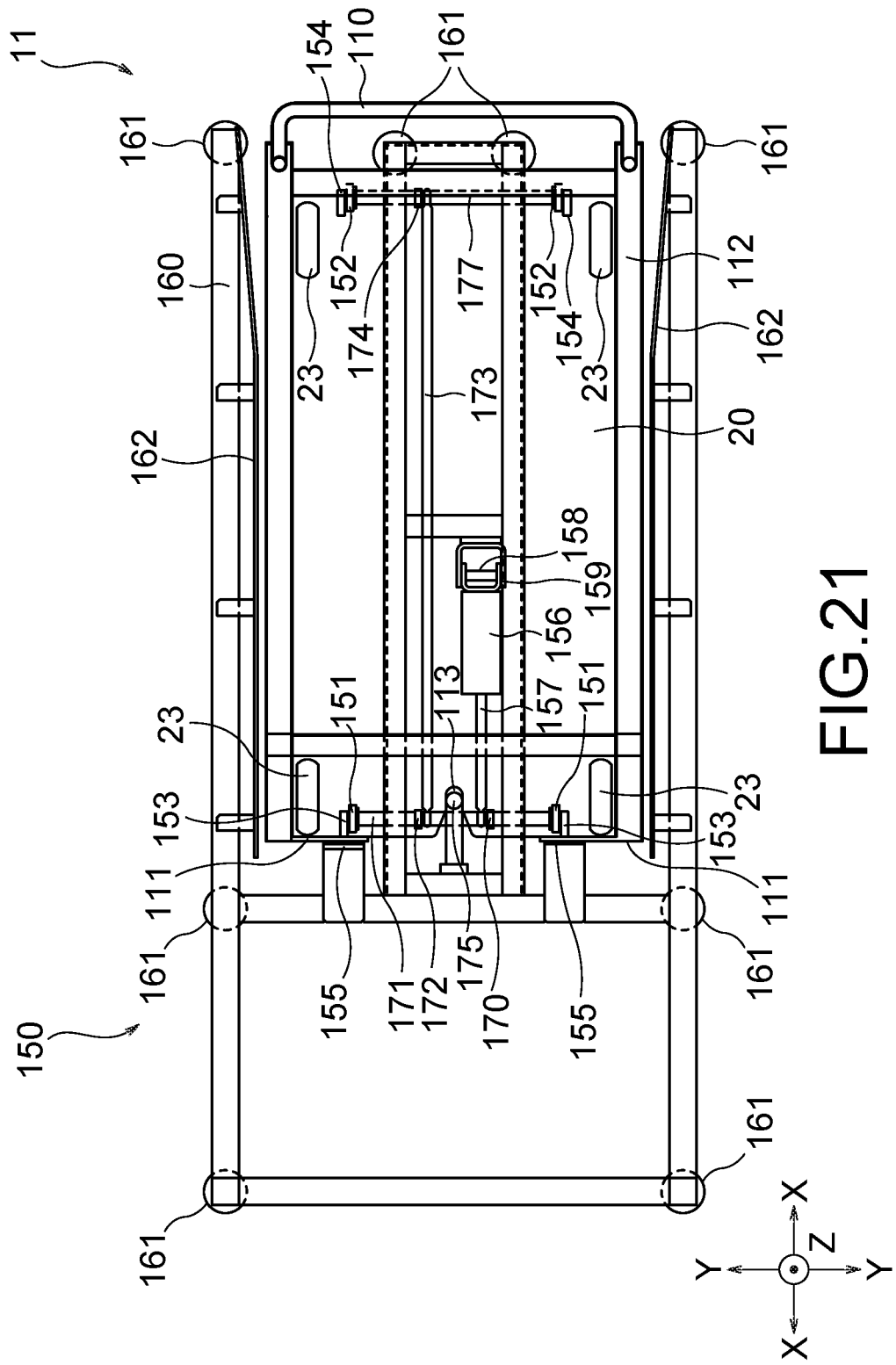
FIG. 21 is a plan view of the bag stocker and the wagon lock device according to the fifth modification, which illustrates the locked, state.

FIG. 18 is a side view illustrating a bag stocker 11 and a wagon lock device 150 according to a fifth modification, which illustrates a non-locked state. FIG. 19 is a side view illustrating a bag stocker 11 and a wagon lock device 150 according to a fifth modification, illustrating a locked state. FIG. 20 is a plan view of the bag stocker 11 and the wagon lock device 150 according to the fifth modification, which illustrates the non-locked state. FIG. 21 is a plan view of the bag stocker 11 and the wagon lock device 150 according to the fifth modification, which illustrates the locked state. Incidentally, in order to facilitate the understanding, FIGS. 18 to 20 illustrate some of internal configurations in a perspective manner in some cases, and there may be elements which are not illustrated.

It is preferable that the bag stocker 11 arranged at a taking-out position P1 (see FIG. 3) be accurately arranged at a predetermined position and fixed at the predetermined position such that a bag bundle B1 is smoothly and reliably taken out by a taking-out unit 31. An allowable deviation amount from the predetermined position of the bag stocker 11 arranged at the taking-out position P1 also varies depending on the capability of the taking-out unit 31, but is often about less than 1 cm (more preferably about 5 mm) in practice. Therefore, it is preferable that the bag stocker 11 be fixed at the taking-out position P1 (predetermined position).

In the present modification, the entire bag stocker 11 is fixed at the predetermined position while lifting the bag stocker 11 by the wagon lock device 150.

The illustrated bag stocker 11 includes: a wagon frame 112 on which a body portion 20 is placed; a handle 110 which extends upward from the wagon frame 112 and is operated by a worker W; and a wagon-side stopper 111 provided at a distal end of the wagon frame 112.

The wagon lock device 150 includes: a first lever 151 provided on the front side; a second lever 152 provided on the rear side; a first bearing 153 rotatably attached to a distal end portion of the first lever 151; a second bearing 154 rotatably attached to a distal end portion of the second lever 152; a lock frame 160 rotatably supporting the first lever 151 and the second lever 152; a lock-device-side stopper 155 attached to the lock frame 160; and a leg portion 161 supporting the lock frame 160 on a ground G.

As illustrated in FIGS. 20 and 21, the wagon frame 112 of the bag stocker 11 is pushed and moved by the worker W via the handle 110, is guided by a side guide 162 attached to the lock frame 160 of the wagon lock device 150, and is stopped at a locking position illustrated in FIG. 21. In this locking position, a regulation pin 175, which is fixed to the lock frame 160 and extends upward, is engaged with a guide engagement groove 113 formed in a bottom wall of the body portion 20. Further, when the bag stocker 11 is placed at the locking position, the wagon-side stopper 111 and the lock-device-side stopper 155 abut on each other. As a result, the bag stocker 11 is regulated with respect to the wagon lock device 150 regarding an X direction and a Y direction (that is, the horizontal direction) illustrated in FIGS. 20 and 21.

Further, when the bag stocker 11 is placed at the locking position, an air cylinder 156 attached to the lock frame 160 is driven via an air cylinder holding portion 159, an air cylinder shaft 157 extends, and a third lever 170 is rotated about a driving rotary shaft 171 while being pushed in the X direction (the left direction in FIGS. 20 and 21). Along with the rotation of the third lever 170, the air cylinder 156 rotates about an air cylinder rotary shaft 158. The air cylinder rotary shaft 158 is rotatably attached to the air cylinder shaft 157. As a result, the driving rotary shaft 171 fixed to the third lever 170 is axially rotated. Therefore, a fourth lever 172 and the first lever 151 fixed to the driving rotary shaft 171 rotate about the driving rotary shaft 171, and distal end portions of the fourth lever 172 and the first lever 151 ascend. As a result, the first bearing 153 lifts the wagon frame 112 as illustrated in FIG. 19. At this time, the wagon-side stopper 111 is sandwiched between the first bearing 153 and the lock-device-side stopper 155, and the bag stocker 11 is fixed to the wagon lock device 150 regarding the X direction (the left-right direction in FIG. 19). Further, the wagon-side stopper 111 is fixed to the wagon lock device 150 by providing the "structure in which the wagon-side stopper 111 is sandwiched between the first bearing 153 and the lock-device-side stopper 155" at a plurality of places (two places in the illustrated example) in the horizontal direction (Y direction).

As described above, when the fourth lever 172 axially rotates about the driving rotary shaft 171 and moves in the X direction (the left direction in FIGS. 20 and 21), a connecting shaft 173 rotatably connected to the driving rotary shaft 171 also moves in the same direction, and a fifth lever 174 rotatably connected to the connecting shaft 173 also rotates about a driven rotary shaft 177 while moving in the same direction. As a result, the second lever 152 fixed to the driven rotary shaft 177 axially rotates about the driven rotary shaft 177, and the second bearing 154 ascends. As a result, the second bearing 154 lifts the wagon frame 112 as illustrated in FIG. 19.

As described above, according to the present modification, the bag stocker 11 is arranged at the locking position (see FIG. 21) to operate the air cylinder 156, so that it is possible to accurately and reliably fix the bag stocker 11 to the wagon lock device 150 at a predetermined position by the engagement between the guide engagement groove 113 and the regulation pin 175, lifting of the bag stocker 11 by the first bearing 153 and the second bearing 154 (particularly, lifting of a caster 23 from the ground G), and the sandwiching of the wagon-side stopper 111 between the first bearing 153 and the lock-device-side stopper 155.

Further, when the various levers and rotary shafts are combined as in the present modification, it is possible to drive both a front mechanism (that is, the first lever 151 and the first bearing 153) and a rear mechanism (that is, the second lever 152 and the second bearing 154) using a single drive unit (that is, the air cylinder 156).

[Sixth Modification]

Figure 22:
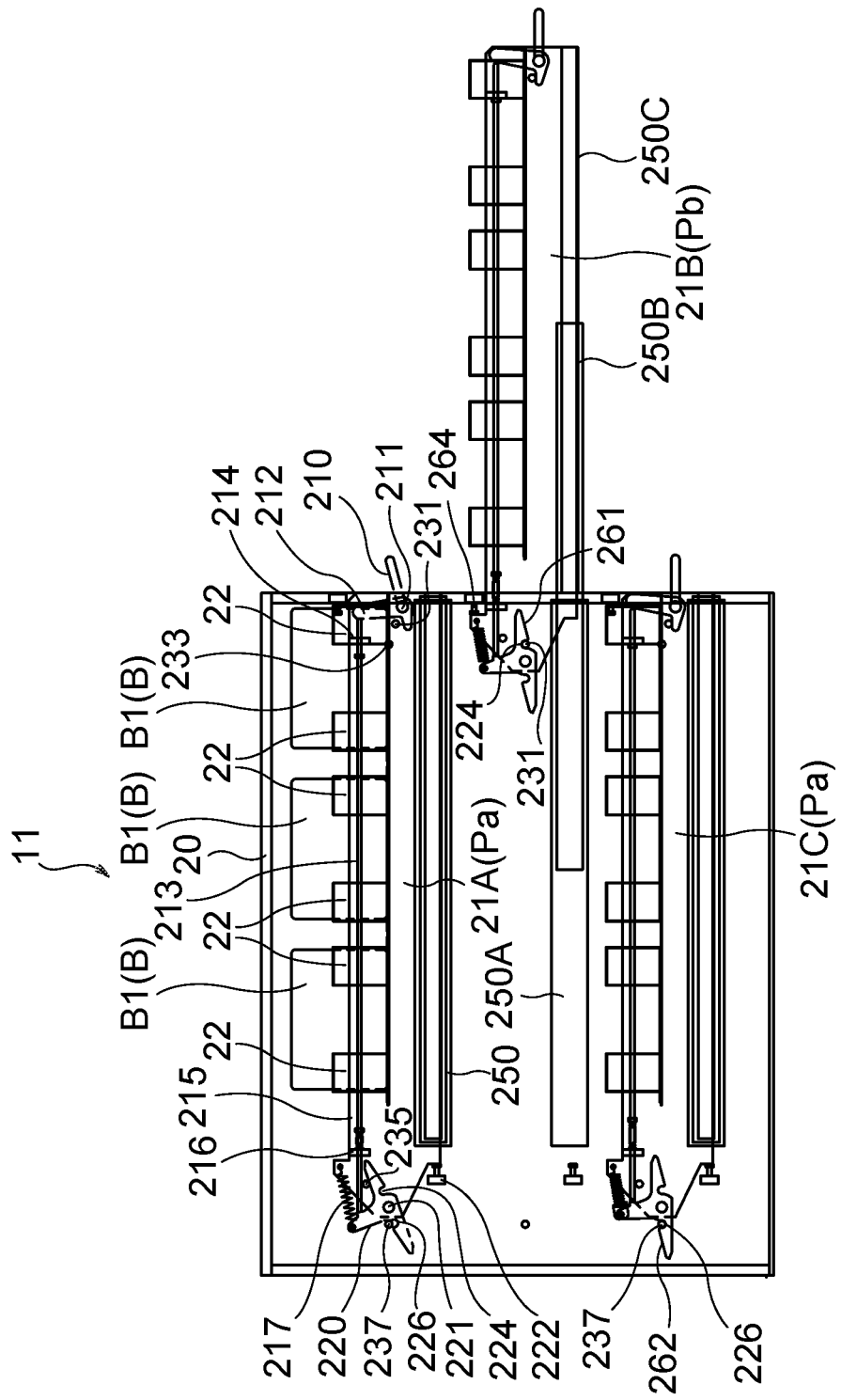
FIG. 22 is a side view illustrating a bag stocker according to a sixth modification, which illustrates a configuration inside the bag stocker.

FIG. 22 is a side view illustrating a hag stocker 11 according to a sixth modification, which illustrates a configuration inside the bag stocker 11.

A mechanism that causes the hag accommodating unit 21 to slide with respect to a body portion 20 is not limited, but is desirably a mechanism that can lock the bag accommodating unit 21 to the body portion 20 at least one (preferably both) of an accommodating position Pa and a withdrawing position Pb. In the present modification, an example of such a lock mechanism of the bag accommodating unit 21 will be described.

FIG. 22 illustrates the bag stocker 11 in which three bag accommodating units 21A, 21B, and 21C are arrayed in the vertical direction as an example. The uppermost bag accommodating unit 21A illustrated in FIG. 22 is unlocked at the accommodating position Pa and is in the state of being movable from the accommodating position Pa to the withdrawing position Pb. The middle bag accommodating unit 21B is in the locked state at the withdrawing position Pb. The lowermost bag accommodating unit 21C is in the locked state at the accommodating position Pa.

Each of the bag accommodating units 21 includes moving plates 215 provided on both sides. A stretchable slide rail 250 is attached to the body portion 20, and the moving plate 215 is attached to the slide rail 250. The illustrated slide rail 250 includes: a first slide rail 250A attached to the body portion 20; a second slide rail 250E provided slidably with respect to the first slide rail 250A at the inner side of the first slide rail 250A; and a third slide rail 250C provided slidably with respect to the second slide rail 250B at the inner side of the second slide rail 250B. The moving plate 215 is attached to the third slide rail 250C. When the bag accommodating unit 21 is arranged at the accommodating position Pa, the first slide rail 250A to the third slide rail 250C overlap each other, and the slide rail 250 is in a contracted state. On the other hand, when the bag accommodating unit 21 is arranged at the withdrawing position Pb, the first slide rail 250A to the third slide rail 250C are arranged at positions shifted from each other in the sliding direction, and the slide rail 250 is in a stretched state.

Incidentally, a stopper 222 attached to the body portion 20 contacts the bag accommodating unit 21 arranged at the accommodating position Pa so that further movement (movement to the left side in FIG. 22) of the bag accommodating unit 21 from the accommodating position Pa is prevented. Further, when the bag accommodating unit 21 is arranged at the withdrawing position Pb, a stopper 264 attached to the body portion 20 contacts the moving plate 215 so that further movement (movement to the right side in FIG. 22) of the bag accommodating unit 21 from the withdrawing position Pb is prevented.

An accommodating portion handle 210 is provided to be rotatable about a handle rotary shaft 211, and both end portions of the handle rotary shaft 211 are rotatably attached to the moving plates 215, respectively. A handle lever 212 is attached to the handle rotary shaft 211, and the handle lever 212 rotates in accordance with a shaft rotation of the handle rotary shaft 211.

Each of the moving plates 215 is provided with a supporting block 214 and a supporting block 216, and a lock movement shaft 213 extending in the sliding direction of the bag accommodating unit 21 is supported by the supporting block 214 and the supporting block 216 so as to be movable in the sliding direction. One end portion of the lock movement shaft 213 abuts on the handle lever 212, and the other end portion thereof abuts on the lock lever 220.

The lock lever 220 is attached to the moving plate 215 via a tension spring 217, and an elastic force of the tension spring 217 acts on the lock lever 220. Further, the lock lever 220 is rotatably attached to the moving plate 215 via a lock rotary shaft 221, and rotates about the lock rotary shaft 221. A first lock groove 224 and a second lock groove 226 are formed in the lock lever 220.

The bag stocker 11 includes a first stopper shaft 231, a second stopper shaft 233, a third stopper shaft 235, and a fourth stopper shaft 237. The first stopper shaft 231 is attached to the moving plate 215, the second stopper shaft 233 is attached to the body portion 20, the third stopper shaft 235 is attached to the moving plate 215, and the fourth stopper shaft 237 is attached to the body portion 20. The first stopper shaft 231 and the fourth stopper shaft 237 are provided in order to lock the bag accommodating unit 21, and the second stopper shaft 233 and the third stopper shaft 235 are provided in order to regulate an attitude (that is, an inclination) of the lock lever 220.

As the fourth stopper shaft 237 is engaged with the second lock groove 226 in the state where the bag accommodating unit 21 is arranged at the accommodating position Pa, the bag accommodating unit 21 is locked at the accommodating position Pa (see the "bag accommodating unit 21C" in FIG. 22). On the other hand, as the first stopper shaft 231 is engaged with the first lock groove 224 in the state where the bag accommodating unit 21 is arranged at the withdrawing position Pb, the bag accommodating unit 21 is locked at the withdrawing position Pb (see the "bag accommodating unit 21B" in FIG. 22). When the bag accommodating unit 21 is in the locked state, the handle lever 212 is not inclined or almost not inclined via the accommodating portion handle 210, and the tension spring 217 is relatively contracted, and the lock lever 220 takes a first attitude. On the other hand, as the handle lever 212 is inclined via the accommodating portion handle 210, the lock movement shaft 213 is pushed by the handle lever 212, the lock movement shaft 213 pushes the lock lever 220, the tension spring 217 is relatively stretched, and the lock lever 220 takes a second attitude. In this manner, the worker W can rotate the lock lever 220 about the lock rotary shaft 221 to be placed in the first attitude and the second attitude by operating the accommodating portion handle 210, and can perform a slide lock of each of the bag accommodating units 21 and release the lock thereof.

Incidentally, the lock lever 220 has a first inclined surface 261 guiding the first stopper shaft 231 to the first lock groove 224 and a second inclined surface 262 guiding the fourth stopper shaft 237 to the second lock groove 226. When the bag accommodating unit 21 is moved from the accommodating position Pa to the withdrawing position Pb, the first stopper shaft 231 contacts the first inclined surface 261 of the lock lever 220 placed in the first attitude. Thereafter, the first stopper shaft 231 slides on the first inclined surface 261 and gradually rotates the lock lever 220 about the lock rotary shaft 221, and is finally engaged with the first lock groove 224 at the withdrawing position Pb. Similarly, when the bag accommodating unit 21 is moved from the withdrawing position Pb to the accommodating position Pa, the fourth stopper shaft 237 contacts the second inclined surface 262 of the lock lever 220 placed in the first attitude. Thereafter, the fourth stopper shaft 237 slides on the second inclined surface 262 and gradually rotates the lock lever 220 about the lock rotary shaft 221, and is finally engaged with the second lock groove 226 at the accommodating position Pa.

In this manner, each of the bag accommodating units 21 can be slidably provided with respect to the body portion 20, and each of the bag accommodating units 21 can be provided so as to be lockable at the accommodating position Pa and the withdrawing position Pb according to the bag stocker 11 of the present modification.

[Other Modifications]

In the above embodiments and modifications, the specific number of each of elements is not limited. In particular, only one of each of the elements provided in the depositing unit 33 or on the downstream side of the depositing unit 33 may be provided, or a plurality of the elements may be provided.

Further, the plurality of bag accommodating units 21 are provided in each of the bag stockers 11, and the plurality of holding members 22 are provided in each of the bag accommodating units 21 in the above-described embodiments and modifications, but the invention is not limited thereto. That is, only the single bag accommodating unit 21 may be provided in each of the bag stockers 11, or only the single holding member 22 may be provided in each of the bag accommodating units 21.

Aspects including components and/or methods other than the above-described components and/or methods may also be included in embodiments of the present invention. Further, aspects in which some of the above-described components and/or methods are not included may also be included in embodiments of the present invention. Further, aspects including some components and/or methods included in an embodiment of the present invention and some components and/or methods included in another embodiment of the present invention may also be included in embodiments of the present invention. Therefore, components and/or methods included in each of the above-described embodiments and modifications and embodiments of the present invention other than those described above may be combined, and aspects according to such combinations may also be included in embodiments of the present invention. Further, the effects exerted by the present invention are not limited to the above-described effects, and specific effects according to the specific configuration of each embodiment can be exerted. In this manner, various additions, modifications, and partial deletions can be made to the respective elements described in the claims, the specification, the abstract, and the drawings without departing from a technical idea and a gist of the present invention.

The invention claimed is:

1. A bag supply system comprising:
   a bag accommodating unit having a holding member configured to externally support a bag bundle;
   a moving unit configured to move the bag accommodating unit to a bag bundle replenishment position where the bag bundle is supplied to the bag accommodating unit and a bag bundle supply position where the bag bundle is taken out of the bag accommodating unit; and
   a bag supply device to which a plurality of bags are supplied from the bag accommodating unit arranged at the bag bundle supply position,
   wherein the bag supply device includes:
      a taking-out unit configured to take the bag bundle out of the bag accommodating unit and carries the bag bundle to a depositing unit;
      a bag transporting unit configured to transport the bag bundle from the depositing unit to accommodate the bag bundle in a magazine; and
      a first bag pickup unit configured to take out each bag individually from the bag bundle accommodated in the magazine, the bag bundle having two or more bags,
   wherein the holding member supports the bag bundle in a state of exposing a part of one of a front surface and a back surface of each of a bag arranged on a frontmost side and a bag arranged on a backmost side of the two or more bags included in the bag bundle, and
   wherein the taking-out unit takes the bag bundle out of the bag accommodating unit while holding the exposed parts of the bags arranged on the frontmost side and the backmost side in the bag bundle supported by the holding member.

2. The bag supply system as defined in claim 1, wherein the front surfaces and the back surfaces of the two or more bags included in the bag bundle are directed in a same direction, and
   wherein the holding member supports the bag bundle in a state where a normal direction of the front surfaces and the back surfaces of the two or more bags is directed in a direction other than a direction parallel to a generally vertical direction.

3. The bag supply system as defined in claim 1, wherein the taking-out unit includes:
   a bag holding unit configured to hold and release the bag bundle; and
   a three-dimensional moving unit configured to three-dimensionally move the bag holding unit.

4. The bag supply system as defined in claim 1, wherein the depositing unit includes:
   a transport placement portion on which the bag bundle is placed by the taking-out unit; and
   a guide portion configured to guide the bag bundle on the transport placement portion, and
   wherein the bag transporting unit transports the bag bundle on the transport placement portion along the guide portion and enables the bag bundle to be accommodated in the magazine.

5. The bag supply system as defined in claim 4, wherein the bag transporting unit includes a pusher configured to push the bag bundle on the transport placement portion toward the magazine.

6. The bag supply system as defined in claim 1, wherein the moving unit includes a bag stocker configured to support the bag accommodating unit and has a body portion provided to be movable between an inside and an outside of a supply room, and
   wherein the bag supply device is provided inside the supply room, and the plurality of bags are supplied to the bag supply device from the bag accommodating unit supported by the body portion.

7. The bag supply system as defined in claim 6, wherein a plurality of bag stockers are provided, and
   wherein a plurality of bags are supplied to the bag supply device from each of the plurality of bag stockers.

8. The bag supply system as defined in claim 6, wherein the bag accommodating unit is supported by the body portion to be movable in the body portion between an accommodating position and a withdrawing position where the bag accommodating unit protrudes in comparison with the bag accommodating unit arranged at the accommodating position,
   wherein the bag accommodating unit has a holding portion for movement, and is moved between the accommodating position and the withdrawing position by applying a force to the holding portion for movement, and
   wherein the bag supply device includes a movement device configured to apply a force to the holding portion for movement to move the bag accommodating unit from the accommodating, position to the withdrawing, position.

9. The bag supply system as defined in claim 8, wherein the movement device is the taking-out unit.

10. The bag supply system as defined in claim 6, wherein the bag stocker supports a plurality of bag accommodating units.

11. The bag supply system as defined in claim 10, wherein, when the moving unit moves the plurality of bag accommodating units from the bag bundle replenishment position to the bag bundle supply position, the moving unit moves the plurality of bag accommodating units in a state where at least two or more bag accommodating units among the plurality of bag accommodating units are mutually aligned in a vertical direction.

12. The bag supply system as defined in claim 1, wherein the moving unit includes a feeding mechanism configured to convey the bag accommodating unit from a bag replenishment position where the bag accommodating unit is replenished, toward the bag bundle supply position, and
   wherein the plurality of bags are supplied from the bag accommodating unit to the bag supply device at the bag bundle supply position.

13. The bag supply system as defined in claim 12, wherein a plurality of bag accommodating units are piled up and are replenished to the feeding mechanism at the bag replenishment position, and
   wherein the feeding mechanism conveys the bag accommodating units one by one to the bag bundle supply position.

14. The bag supply system as defined in claim 1, wherein the bag supply device includes an arrangement adjustment unit configured to adjust mutual arrangement positions of the two or more bags included in the bag bundle received from the taking-out unit, and
    wherein the taking-out unit delivers the bag bundle taken out of the bag accommodating unit to the arrangement adjustment unit, receives the bag bundle of which an arrangement position has been adjusted by the arrangement adjustment unit from the arrangement adjustment unit, and carries the bag bundle received from the arrangement adjustment unit to the depositing unit.

15. The bag supply system as defined in claim 1, wherein the bag supply device includes:
    a bag conveying unit configured to receive a bag fed via the first bag pickup unit and conveys the bag toward a downstream side;
    a conveyance stopper configured to regulate a position of the bag conveyed by the bag conveying unit; and
    a second bag pickup unit configured to take out the bag of which the position is regulated by the conveyance stopper and supplies the bag to a bag processing device.

16. The bag supply system as defined in claim 15, wherein the bag conveying unit conveys a plurality of bags toward the downstream side in a state where the plurality of bags are stacked on each other, and
    wherein the conveyance stopper regulates a position of a leading bag among the plurality of bags conveyed by the bag conveying unit.

17. The bag supply system as defined in claim 1, wherein the first bag pickup unit supplies a bag taken out of the magazine to a bag processing device.

18. The bag supply system as defined in claim 1, wherein the bag bundle is placed on the holding member, and
    wherein the holding, member contacts at least a part of two sides adjacent to each other, among a plurality of sides of each of the two or more bags included in the bag bundle.

19. The bag supply system as defined in claim 1, wherein the bag accommodating unit includes a plurality of holding members.

20. A bag supply method comprising the steps of:
    replenishing a plurality of bags to a bag accommodating unit; and
    supplying, the plurality of bags from the bag accommodating unit to a bag supply device,
    wherein the bag accommodating unit has a holding member to externally support a bag bundle,
    wherein the bag accommodating unit is moved by a moving unit to a bag bundle replenishment position where the bag bundle is supplied to the bag accommodating unit and a bag bundle supply position where the bag bundle is taken out of the bag accommodating unit,
    wherein the bag supply device includes:
        a taking-out unit configured to take the bag bundle out of the bag accommodating unit arranged at the bag bundle supply position and carries the bag bundle to a depositing unit;
        a bag transporting unit configured to transport the bag bundle from the depositing unit and enables the bag bundle to be accommodated in a magazine; and
        a first bag pickup unit configured to take out each of two or more bags included in the bag bundle accommodated in the magazine,
    wherein the plurality of bags are supported by the holding member in a form of the bag bundle in the bag accommodating unit,
    wherein each of the plurality of bags supplied from the bag accommodating unit to the bag supply device is a bag included in the bag bundle taken out of the holding member,
    wherein the holding member supports the bag bundle in a state of exposing a part of one of a front surface and a back surface of each of a bag arranged on a frontmost side and a bag arranged on a backmost side of the two or more bags included in the bag bundle, and
    wherein the taking-out unit takes the bag bundle out of the bag accommodating unit while holding the exposed parts of the bags arranged on the frontmost side and the backmost side in the bag bundle supported by the holding member.

21. The bag supply method as defined in claim 20, wherein the front surfaces and the back surfaces of the two or more bags included in the bag bundle are directed in a same direction, and
    wherein the holding member supports the bag bundle in a state where a normal direction of the front surfaces and the back surfaces of the two or more bags is directed in a direction other than a direction parallel to a generally vertical direction.

22. The bag supply method as defined in claim 20, wherein the moving unit includes a bag stocker configured to support the bag accommodating unit and has a body portion provided to be movable between an inside and an outside of a supply room,
    wherein the bag supply device is provided inside the supply room, and the plurality of bags are supplied from the bag accommodating unit supported by the body portion,
    wherein the bag accommodating unit is supported by the body portion to be movable in the body portion between an accommodating position and a withdrawing position where the bag accommodating unit protrudes in comparison with the bag accommodating unit arranged at the accommodating position,
    wherein the bag accommodating unit has a holding portion for movement, and the bag accommodating unit is moved between the accommodating position and the withdrawing position by applying a force to the holding portion for movement, and
    wherein the step of replenishing the plurality of bags to the bag stocker comprises the steps of:
        moving the bag accommodating unit from the accommodating position to the withdrawing position in the body portion;
        supplying a plurality of bags to the bag accommodating unit arranged at the withdrawing position and causing the holding member to support the plurality of bags as the bag bundle; and
        moving the bag accommodating unit in a state where the corresponding holding member supports the bag bundle, from the withdrawing position to the accommodating position.

23. The bag supply method as defined in claim 22, wherein the bag supply device includes a movement device configured to apply a force to the holding portion for movement to move the bag accommodating unit from the accommodating position to the withdrawing position,
    wherein the movement device is the taking-out unit, and
    wherein the step of supplying the plurality of bags from the bag accommodating unit to the bag supply device includes the step of causing the movement device to apply the force to the holding portion for movement so as to move the bag accommodating unit from the accommodating, position to the withdrawing position.

24. The bag supply method as defined in claim 22, wherein the bag stocker includes a plurality of bag accommodating units.

25. The bag supply method as defined in claim 20, wherein the moving unit includes a feeding mechanism configured to convey the bag accommodating unit from a bag replenishment position where the bag accommodating unit is replenished toward the bag bundle supply position, and wherein the plurality of bags are supplied from the bag accommodating unit to the bag supply device at the bag bundle supply position.

26. The bag supply method as defined in claim 25, wherein a plurality of bag accommodating units are piled up and are replenished to the feeding, mechanism at the bag replenishment position, and wherein the feeding mechanism conveys the bag accommodating units one by one to the bag bundle supply position.

27. The bag supply method as defined in claim 20, wherein the bag supply device includes an arrangement adjustment unit configured to adjust mutual arrangement positions of the two or more bags included in the bag bundle received from the taking-out unit, and wherein the step of supplying the plurality of bags from the bag accommodating unit to the bag supply device includes the steps of:

delivering the bag bundle taken out of the bag accommodating unit by the taking-out unit, to the arrangement adjustment unit;

causing the arrangement adjustment unit to adjust an arrangement position of the bag bundle; and causing the taking-out unit to receive the bag bundle of which the arrangement position has been adjusted by the arrangement adjustment unit, from the arrangement adjustment unit and to carry the bag bundle to the depositing unit.

28. The bag supply method as defined in claim 20, wherein the magazine holds the accommodated bag bundle to be movable up and down, and wherein the step of supplying the plurality of bags from the bag accommodating unit to the bag supply device includes the step of causing the first bag pickup unit to take out a bag arranged at an uppermost position of the bag bundle accommodated in the magazine.

29. The bag supply method as defined in claim 20, wherein the bag accommodating unit includes a plurality of holding members.

* * * * *